United States Patent
Cai et al.

(10) Patent No.: US 12,317,179 B2
(45) Date of Patent: May 27, 2025

(54) DYNAMIC ACCESS NETWORK SELECTION BASED ON APPLICATION ORCHESTRATION INFORMATION IN AN EDGE CLOUD SYSTEM

(71) Applicant: Telefonaktiebolaget LM Ericsson (publ), Stockholm (SE)

(72) Inventors: Xuejun Cai, Täby (SE); Björn Skubic, Sollentuna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 17/310,914

(22) PCT Filed: Mar. 8, 2019

(86) PCT No.: PCT/SE2019/050204
§ 371 (c)(1),
(2) Date: Aug. 30, 2021

(87) PCT Pub. No.: WO2020/185130
PCT Pub. Date: Sep. 17, 2020

(65) Prior Publication Data
US 2022/0141761 A1 May 5, 2022

(51) Int. Cl.
*G06F 15/177* (2006.01)
*H04L 41/082* (2022.01)
(Continued)

(52) U.S. Cl.
CPC ........... *H04W 48/18* (2013.01); *H04L 41/082* (2013.01); *H04L 41/0893* (2013.01); *H04L 67/63* (2022.05); *H04W 48/14* (2013.01)

(58) Field of Classification Search
CPC ..... H04W 48/18; H04W 48/14; H04W 48/16; H04W 40/246; H04W 40/248;
(Continued)

(56) References Cited

U.S. PATENT DOCUMENTS 8,185,152 B1 * 5/2012 Goldner ............... H04W 48/18
   455/437
9,060,372 B2 * 6/2015 Sachs ................... H04W 48/18
(Continued)

FOREIGN PATENT DOCUMENTS

WO   WO-2017100640 A1 *  6/2017

OTHER PUBLICATIONS

International Search Report and Written Opinion for Application No. PCT/SE2019/050204, dated Nov. 5, 2019, 12 pages.
(Continued)

*Primary Examiner* — Dustin Nguyen
*Assistant Examiner* — Hao H Nguyen
(74) *Attorney, Agent, or Firm* — Nicholson De Vos Webster & Elliott LLP

(57) ABSTRACT

A method for dynamic access network selection by a user equipment based on application orchestration information in an edge cloud system. The method includes determining, by a network discovery function, application orchestration information describing placement of instances of one or more applications in the edge cloud system; generating, by the network discovery function, one or more access network policies for the user equipment based on the application orchestration information; and transmitting, by the network discovery function, the one or more access network policies to the user equipment such that, based on the one or more access network policies, the user equipment is to select one or more of an access network from a plurality of access networks available to the user equipment for the user equipment to connect to and which access network from the plurality of access networks to route particular data flows.

17 Claims, 16 Drawing Sheets

| ACCESS NETWORK POLICY ID 204 | DESCRIPTION/CONDITION 206 | RULE PRIORITY 208 | ROUTING CRITERIA 210 | ROUTING RULE 212 |
|---|---|---|---|---|
| 1 | APPID = "APPX" & DOMAINNAME = "APPX.COM" & STARTSOURCEIPADDRESS = "A.B.C.D" | 2 | TIMEOFDAY = "PEAK" | AN1={ACCESSTECHNOLOGY=5G; ACCESSNETWORKPRIORITY=1} AN2={ACCESSTECHNOLOGY=802.11; ACCESSID=WIFI_EDC1; ACCESSNETWORKPRIORITY=2} |
| 2 | APPID = "APPY" & STARTSOURCEIPADDRESS="U.V.W.X" | 1 | VALIDITYAREA = "3GPPLOCATION" | AN1={ACCESSTECHNOLOGY=802.11; ACCESSID=WIFI_EDC1; ACCESSNETWORKPRIORITY=1} AN2={ACCESSTECHNOLOGY=LTE; ACCESSNETWORKPRIORITY=2} |

(51) Int. Cl.
*H04L 41/0893* (2022.01)
*H04L 67/63* (2022.01)
*H04W 48/14* (2009.01)
*H04W 48/18* (2009.01)

(58) Field of Classification Search
CPC .............. H04L 41/082; H04L 41/0893; H04L 67/1097; H04L 67/63; H04L 45/306; H04L 47/20; H04L 12/5691
See application file for complete search history.

(56) References Cited

U.S. PATENT DOCUMENTS

| | | | |
|---|---|---|---|
| 9,258,742 B1* | 2/2016 | Pianigiani | H04L 63/20 |
| 9,526,022 B2* | 12/2016 | Gupta | H04W 24/02 |
| 10,834,135 B1* | 11/2020 | Chhabra | H04L 63/1433 |
| 2011/0110300 A1* | 5/2011 | Sachs | H04W 48/18 |
| | | | 370/328 |
| 2012/0185915 A1* | 7/2012 | Pramod | H04L 63/102 |
| | | | 726/1 |
| 2014/0040504 A1* | 2/2014 | Gupta | H04W 4/02 |
| | | | 370/254 |
| 2014/0071854 A1* | 3/2014 | Xiang | H04W 48/16 |
| | | | 370/254 |
| 2014/0160994 A1* | 6/2014 | Garcia Martin | H04L 12/1407 |
| | | | 370/259 |
| 2014/0185524 A1* | 7/2014 | Kekki | H04L 45/308 |
| | | | 370/328 |
| 2014/0258374 A1 | 9/2014 | Suryanarayanan et al. | |
| 2014/0259012 A1* | 9/2014 | Nandlall | G06F 9/45558 |
| | | | 718/1 |
| 2014/0280830 A1* | 9/2014 | Ang | H04L 12/2876 |
| | | | 709/223 |
| 2014/0293796 A1* | 10/2014 | Jeong | H04M 15/66 |
| | | | 370/236 |
| 2015/0036672 A1* | 2/2015 | Kim | H04W 40/02 |
| | | | 370/338 |
| 2015/0098393 A1* | 4/2015 | Tofighbakhsh | H04W 24/02 |
| | | | 370/329 |
| 2015/0099506 A1* | 4/2015 | Iwai | H04W 76/27 |
| | | | 455/419 |
| 2015/0188810 A1* | 7/2015 | Salkintzis | H04W 40/00 |
| | | | 370/328 |
| 2015/0382282 A1* | 12/2015 | Siddam | H04W 48/04 |
| | | | 370/338 |
| 2016/0044570 A1* | 2/2016 | Jeong | H04W 48/16 |
| | | | 370/338 |
| 2016/0057723 A1* | 2/2016 | Horn | H04W 76/28 |
| | | | 455/435.2 |
| 2016/0065480 A1* | 3/2016 | Faccin | H04L 47/20 |
| | | | 370/235 |
| 2016/0142963 A1* | 5/2016 | Salkintzis | H04L 45/308 |
| | | | 370/329 |
| 2016/0157170 A1* | 6/2016 | Daoud Triki | H04L 67/63 |
| | | | 370/329 |
| 2016/0183180 A1* | 6/2016 | Garcia Martin | G06K 7/1413 |
| | | | 370/328 |
| 2016/0255571 A1* | 9/2016 | Yan | H04W 48/16 |
| | | | 455/434 |
| 2016/0337950 A1* | 11/2016 | Navas Cornejo | H04W 48/14 |
| 2016/0359805 A1* | 12/2016 | Spraggs | H04L 41/0895 |
| 2016/0366142 A1* | 12/2016 | Kamble | H04L 63/101 |
| 2017/0019835 A1* | 1/2017 | Lee | H04W 40/248 |
| 2018/0084544 A1* | 3/2018 | Xu | H04W 72/29 |
| 2018/0331885 A1* | 11/2018 | Raymond | H04L 41/0897 |
| 2018/0332442 A1* | 11/2018 | Shaw | H04L 41/12 |
| 2019/0166506 A1* | 5/2019 | Ashrafi | H04B 1/0003 |
| 2019/0253960 A1* | 8/2019 | Hodroj | H04W 36/302 |
| 2020/0004569 A1* | 1/2020 | Gupta | G06F 9/5072 |
| 2020/0007460 A1* | 1/2020 | Guim Bernat | G06F 9/5072 |
| 2020/0008044 A1* | 1/2020 | Poornachandran | H04L 41/5019 |
| 2020/0107403 A1* | 4/2020 | Frydman | H04W 88/182 |
| 2020/0296169 A1* | 9/2020 | Jeuk | H04L 67/141 |
| 2020/0401452 A1* | 12/2020 | Piercey | G06F 9/5016 |
| 2021/0014113 A1* | 1/2021 | Guim Bernat | H04L 41/0273 |
| 2021/0099848 A1* | 4/2021 | Ruan | H04W 84/042 |
| 2022/0312439 A1* | 9/2022 | Bajpai | H04W 84/18 |
| 2023/0128370 A1* | 4/2023 | Shemer | G06F 11/1482 |
| | | | 714/4.11 |
| 2023/0223427 A1* | 7/2023 | Lin | H01L 28/91 |
| | | | 257/60 |
| 2023/0353504 A1* | 11/2023 | Bose | H04L 12/1403 |

OTHER PUBLICATIONS

3GPP TS 24.302 V15.3.0, "3rd Generation Partnership Project; Technical Specification Group Core Network and Terminals; Access to the 3GPP Evolved Packet Core (EPC) via non-3GPP access networks; Stage 3 (Release 15)," Jun. 2018, 174 pages, 3GPP Organizational Partners.

3GPP TS 24.312 V15.0.0, "3rd Generation Partnership Project; Technical Specification Group Core Network and Terminals; Access Network Discovery and Selection Function (ANDSF) Management Object (MO) (Release 15)," Jun. 2018, 394 pages, 3GPP Organizational Partners.

Huawei et al., "Key Issue on Policy Framework," Feb. 23-26, 2016, 2 pages, SA WG2 Meeting #113AH, S2-161016, Sophia Antipolis, France.

Communication under Rule 71(3) EPC, EP Application No. 19712634.5, Nov. 20, 2023, 8 pages.

* cited by examiner

| ACCESS NETWORK POLICY ID 204 | DESCRIPTION/CONDITION 206 | RULE PRIORITY 208 | ROUTING CRITERIA 210 | ROUTING RULE 212 |
|---|---|---|---|---|
| 1 | APPID = "APPX" & DOMAINNAME = "APPX.COM" & STARTSOURCEIPADDRESS = "A.B.C.D" | 2 | TIMEOFDAY = "PEAK" | AN1={ACCESSTECHNOLOGY=5G; ACCESSNETWORKPRIORITY=1} AN2={ACCESSTECHNOLOGY=802.11; ACCESSID=WIFI_EDC1; ACCESSNETWORKPRIORITY=2} |
| 2 | APPID = "APPY" & STARTSOURCEIPADDRESS="U.V.W.X" | 1 | VALIDITYAREA = "3GPPLOCATION" | AN1={ACCESSTECHNOLOGY=802.11; ACCESSID=WIFI_EDC1; ACCESSNETWORKPRIORITY=1} AN2={ACCESSTECHNOLOGY=LTE; ACCESSNETWORKPRIORITY=2} |

FIG. 2

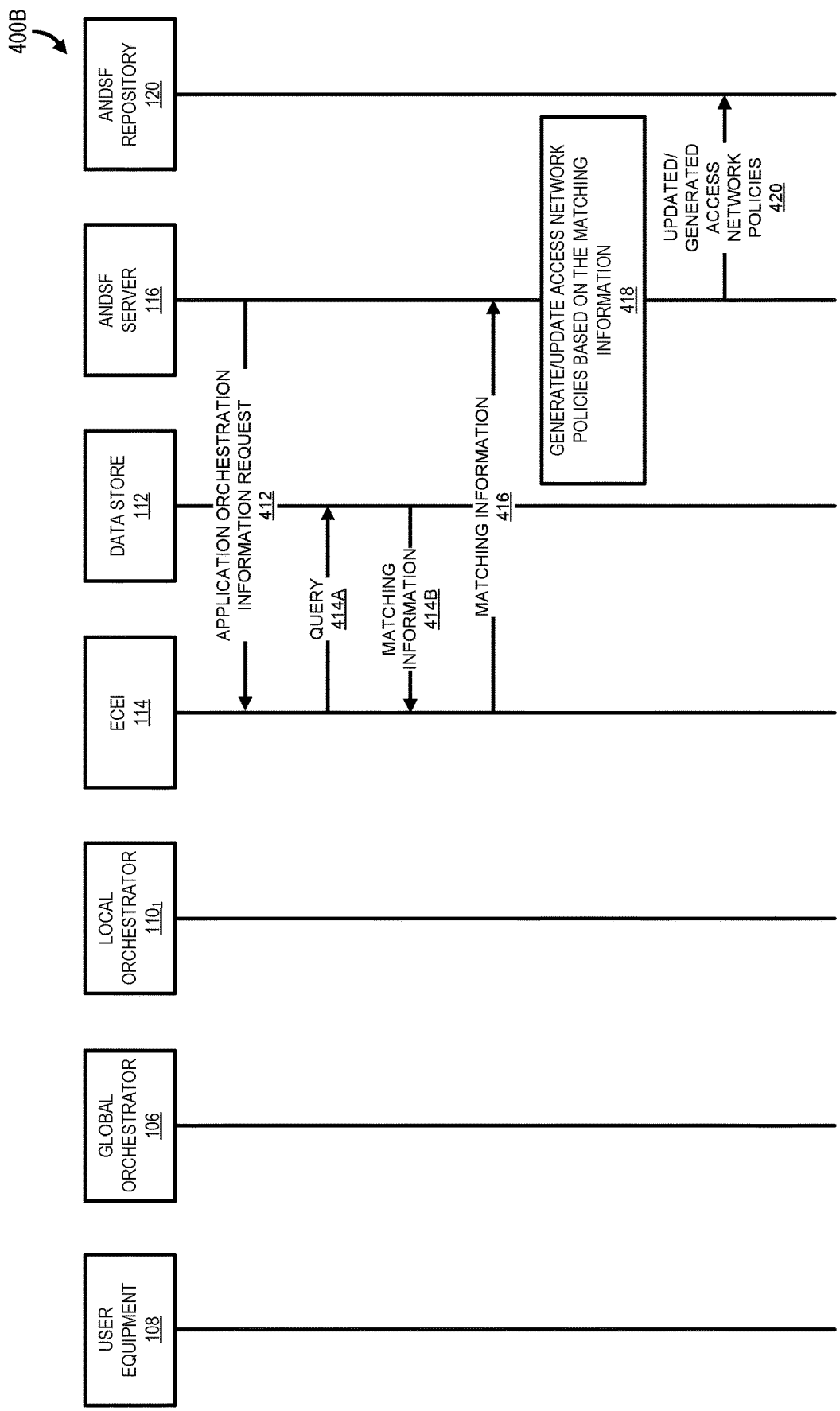

```
                                                                    600
                                                                     ↲

┌─────────────────────────────────────────────────────────────────────┐
│  DETERMINING, BY USER EQUIPMENT, A FIRST SET OF ONE OR MORE ACCESS  │
│  NETWORK POLICIES, WHICH WERE GENERATED BASED ON APPLICATION        │
│  ORCHESTRATION INFORMATION DESCRIBING PLACEMENT OF INSTANCES OF     │
│  ONE OR MORE APPLICATIONS IN AN EDGE CLOUD SYSTEM                   │
│                              602                                    │
└─────────────────────────────────────────────────────────────────────┘
                                   │
                                   ▼
┌─────────────────────────────────────────────────────────────────────┐
│  APPLYING, BY THE USER EQUIPMENT, THE FIRST SET OF ONE OR MORE      │
│  ACCESS NETWORK POLICIES SUCH THAT THE USER EQUIPMENT IS TO SELECT  │
│  (1) AN ACCESS NETWORK FROM A PLURALITY OF ACCESS NETWORKS          │
│  AVAILABLE TO THE USER EQUIPMENT FOR THE USER EQUIPMENT TO CONNECT  │
│  TO AND (2) WHICH ACCESS NETWORK FROM THE PLURALITY OF ACCESS       │
│  NETWORKS TO ROUTE PARTICULAR DATA FLOWS BASED ON THE FIRST SET OF  │
│  ONE OR MORE ACCESS NETWORK POLICIES                                │
│                              604                                    │
└─────────────────────────────────────────────────────────────────────┘
                                   │
                                   ▼
┌ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┐
   DETERMINING, BY THE USER EQUIPMENT, A SECOND SET OF ONE OR MORE
│  ACCESS NETWORK POLICIES IN RESPONSE TO A CHANGE TO THE EDGE CLOUD  │
   SYSTEM, WHEREIN THE SECOND SET OF ONE OR MORE ACCESS NETWORK
│  POLICIES WAS GENERATED BASED ON UPDATED APPLICATION ORCHESTRATION  │
   INFORMATION DESCRIBING PLACEMENT OF INSTANCES OF THE ONE OR MORE
│  APPLICATIONS IN THE EDGE CLOUD SYSTEM FOLLOWING DETECTING OF THE   │
   CHANGE TO THE EDGE CLOUD SYSTEM
│                              606                                    │
└ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┘
                                   │
                                   ▼
┌ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┐
   APPLYING, BY THE USER EQUIPMENT, THE SECOND SET OF ONE OR MORE
│  ACCESS NETWORK POLICIES SUCH THAT ONE OR MORE OF THE DATA FLOWS    │
   IS ROUTED TO ANOTHER ACCESS NETWORK IN THE PLURALITY OF ACCESS
│  NETWORKS                                                           │
                                608
└ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┘
```

FIG. 6

DYNAMIC ACCESS NETWORK SELECTION BASED ON APPLICATION ORCHESTRATION INFORMATION IN AN EDGE CLOUD SYSTEM

CROSS-REFERENCE TO RELATED APPLICATIONS

This application is a National stage of International Application No. PCT/SE2019/050204, filed Mar. 8, 2019, which is hereby incorporated by reference.

TECHNICAL FIELD

Embodiments of the invention relate to the field of edge cloud systems; and more specifically, to dynamic access network selection by user equipment based on application orchestration information in an edge cloud system.

BACKGROUND ART

User equipment may be dispersed in various situations in which multiple access networks are available to the user equipment. For example, a piece of user equipment may be located in an area in which a cellular access network (e.g., a Long-Term Evolution (LTE) access network and/or a 5G access network) and a local area access network (e.g., a WiFi access network) are available to the piece of user equipment. Each access network may provide various benefits and drawbacks. For example, one access network may provide faster transfer rates while another access network may provide a lower cost. Thus, user equipment needs to select the access network that meets its needs for all or part of its traffic if multiple access networks are available.

In 3rd Generation Partnership Project (3GPP) networks, an Access Network Discovery and Selection Function (ANDSF) server may be provided to support user equipment discovery of available access networks. In particular, policies from the ANDSF server may be utilized by user equipment and/or network operators for determining optimal access network connectivity selection and for steering traffic across different access networks.

In some cases, user equipment may decide to use an access network for purposes of cloud computing. Edge computing, as an evolution of cloud computing, brings application hosting from centralized data centers down to the edge of the network. This architecture allows closer proximity to consumers and the data generated by applications, hence providing real-time, low latency and bandwidth efficient access to local access networks. Compared to today's huge and centralized data centers, edge computing includes multiple distributed micro/edge data centers, which in turn include several or dozens of physical servers. Application or service instances hosted in the edge data centers can be started and stopped in different access networks by application orchestrators. Accordingly, in a cloud computing architecture, application instances can be hosted by different edge data centers while user equipment have the capability to connect to multiple access networks either sequentially or simultaneously.

SUMMARY

A method for dynamic access network selection by user equipment based on application orchestration information in an edge cloud system is described. The method includes determining, by a network discovery function, application orchestration information describing placement of instances of one or more applications in the edge cloud system; generating, by the network discovery function, one or more access network policies for the user equipment based on the application orchestration information; and transmitting, by the network discovery function, the one or more access network policies to the user equipment such that, based on the one or more access network policies, the user equipment is to select one or more of (1) an access network from a plurality of access networks available to the user equipment for the user equipment to connect to and (2) which access network from the plurality of access networks to route particular data flows.

A non-transitory machine-readable storage medium is described that provides instructions that, if executed by a processor of a network discovery function server in an edge cloud system, will cause said processor to perform operations. The operations includes determining application orchestration information describing placement of instances of one or more applications in the edge cloud system; generating one or more access network policies for the user equipment based on the application orchestration information; and transmitting the one or more access network policies to the user equipment such that, based on the one or more access network policies, the user equipment is to select one or more of (1) an access network from a plurality of access networks available to the user equipment for the user equipment to connect to and (2) which access network from the plurality of access networks to route particular data flows.

A method for dynamic access network selection by user equipment based on application orchestration information in an edge cloud system is described. The method includes determining, by the user equipment, a first set of one or more access network policies, which were generated based on application orchestration information describing placement of instances of one or more applications in the edge cloud system; and applying, by the user equipment, the first set of one or more access network policies such that the user equipment is to select (1) an access network from a plurality of access networks available to the user equipment for the user equipment to connect to and (2) which access network from the plurality of access networks to route particular data flows based on the first set of one or more access network policies.

As described above, application orchestration information, which described placement of applications/application instances in the edge cloud system, is used to generate access network policies. These access network policies may thereafter be used to assist user equipment determine/manage access network connections. In this way, the application orchestration information is used to intelligently control access network selection by user equipment to improve network quality and efficiency (e.g., ensure an access network is used for particular data flows when that access network is also associated with the placement of an application instance associated with the data flows).

BRIEF DESCRIPTION OF THE DRAWINGS

The invention may best be understood by referring to the following description and accompanying drawings that are used to illustrate embodiments of the invention. In the drawings:

FIG. 2 shows an example set of access network policies, according to one example embodiment.

FIGS. 4A-4E illustrate sequence diagrams for dynamic access network selection, according to one example embodiment.

FIG. 6 illustrates a method for dynamic access network selection by user equipment based on application orchestration information in an edge cloud system, according to one example embodiment.

DETAILED DESCRIPTION

The following description describes methods and apparatus for dynamic access network selection by user equipment based on application orchestration information in an edge cloud system. In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

Figure 1:
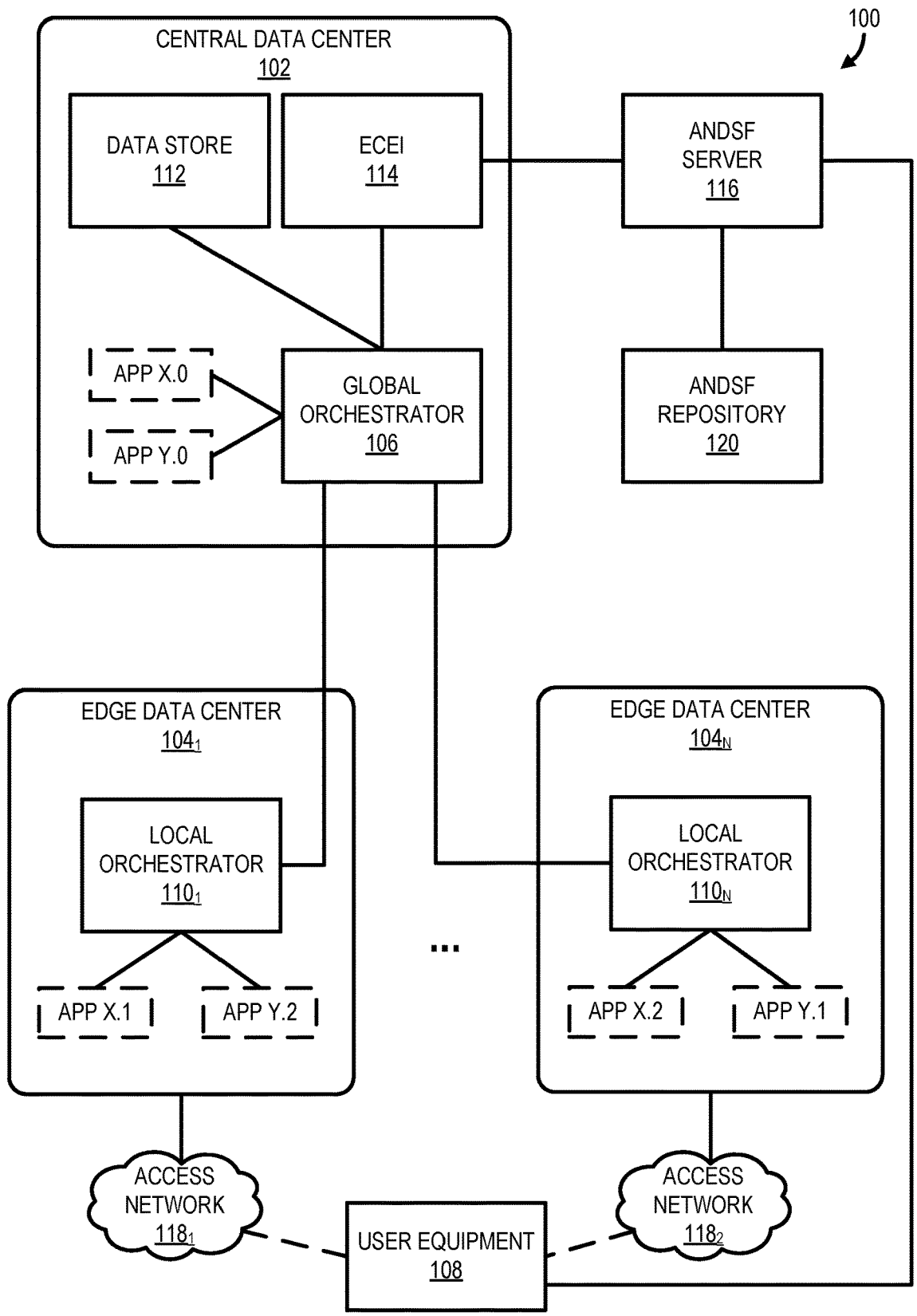
FIG. 1 shows a cloud environment, including a central data center and a set of edge data centers, according to one example embodiment.

FIG. 1 shows a cloud environment 100, including a central data center 102 and a set of edge data centers $104_1$-$104_N$, according to one example embodiment. In this distributed configuration, computation in the cloud environment 100 is largely or completely performed in distributed device/server nodes (sometimes referred to as edge devices) in the edge data centers $104_1$-$104_N$, as opposed to primarily taking place in the central data center 102. In particular, the central data center 102 may include a global orchestrator 106 and a set of device/server nodes (e.g., a few or dozens of device/server nodes). Similarly, the edge data centers $104_1$-$104_N$ each include a respective local orchestrator $110_1$-$110_N$ and set of device/server nodes (e.g., a few or dozens of device/server nodes). The global orchestrator 106 is responsible for orchestrating virtualized applications, including virtualized network functions (e.g., PPF and UPF in 5G networks) and trusted or untrusted services, in the central data center 102 and/or the edge data centers $104_1$-$104_N$. In particular, the virtualized applications or services are assigned or otherwise allocated resources (e.g., processing and/or memory resources) in corresponding device/server nodes in the central data center 102 and/or the edge data centers $104_1$-$104_N$ such that these virtualized applications or services can provide services to users of pieces of user equipment 108. As shown in FIG. 1, multiple virtualized instances of the same application can be running simultaneously in the central data center 102 and/or in one or more of the edge data centers $104_1$-$104_N$. In particular, the instance App X.0 of the application App X can be instantiated and run in the central data center 102 (e.g., in a device/server node of the central data center 102), the instance App X.1 of the application App X can be instantiated and run in the edge data center $104_1$ (e.g., in a device/server node of the edge data center $104_1$), and/or the instance App X.2 of the application App X can be instantiated and run in the edge data center $104_N$ (e.g., in a device/server node of the edge data center $104_N$). Similarly, the instance App Y.0 of the application App Y can be instantiated and run in the central data center 102, the instance App Y.2 of the application App Y can be instantiated and run in the edge data center $104_1$, and/or the instance App Y.1 of the application App Y can be instantiated and run in the edge data center $104_N$.

Although described in relation to applications and corresponding application instances, the techniques described herein can be similarly applied to any software granularity, including services. Accordingly, the use of applications is for purposes of illustration.

In the case of application instances running in the central data center 102, the global orchestrator 106 may manage the instantiating and the running/operation of these instances. For example, the instantiation and running/operation of the application instance App X.0 and/or the application instance App Y.0, including the assignment of the application instances App X.0 and App Y.0 to device/server nodes, may be managed by the global orchestrator 106. In the case of application instances running in an edge data center 104, the global orchestrator 106 in conjunction with a corresponding local orchestrator 110 of the edge data center 104 may manage the instantiating and the running/operation of these instances. For example, the instantiation and running/operation of the application instance App X.1 and/or the application instance App Y.2 may be managed by the global orchestrator 106 and the local orchestrator $110_1$. In particular, the global orchestrator 106 may transmit a request to the local orchestrator $110_1$ to instantiate an instance of the application App X (e.g., the application instance App X.1) and/or an instance of the application App Y (e.g., the application instance App Y.2) in the edge data center $104_1$. Similarly, the global orchestrator 106 may transmit a request to the local orchestrator $110_N$ to instantiate an instance of the application App X (e.g., the application instance App X.2) and/or an instance of the application App Y (e.g., the application instance App Y.1) in the edge data center $104_N$.

Following instantiation of an application, the global orchestrator 106 may store information in the data store 112 corresponding to the instantiation. For example, in response to a request from the global orchestrator 106, the local orchestrator $110_1$ can instantiate an instance of the application App X (e.g., the application instance App X.1) and transmit a completion response to the global orchestrator 106 confirming successful completion of the instantiation of the application App X. Upon receipt of the completion response from the local orchestrator $110_1$, the global orchestrator 106 can store information in the data store 112, which indicates that an instance of the application App X is currently running/operating in the edge data center $104_1$. Accordingly, the data store 112 stores application deployment/orchestration information but may also store additional pieces of information/data objects (e.g., policy information) for use by the control plane of the central data center 102. Although shown as a centralized location of the data store 112, in some embodiments, the data store 112 may be implemented in a distributed fashion across one or more components of the cloud environment 100.

Although shown with a set of local orchestrators 110 in edge data centers 104 that perform instantiation/orchestration of application instances in the edge data centers 104, in some embodiments, the global orchestrator 106 of the central data center 102 may perform instantiation/orchestration of application instances in these edge data centers 104. For example, the global orchestrator 106 can instantiate an instance of the application App X (e.g., the application instance App X.1) in the edge data center $104_1$ and without the need/use of the local orchestrator $110_1$. Accordingly, the architecture of the cloud environment 100 shown in FIG. 1, can be altered and is being used for illustrative purposes.

In some embodiments, the cloud environment 100 may include an Access Network Discovery and Selection Function (ANDSF) server 116 or another similar function. The ANDSF server 116 may be used in a 3rd Generation Partnership Project (3GPP) system to assist the user equipment 108 to access networks (e.g., a WiFi access network or a cellular access network) that can be used for data communication. For example, as shown in FIG. 1, the user equipment 108 may be capable of connecting to both of the access networks $118_1$ and $118_2$ (e.g., the user equipment 108 is within range of radios of the access networks $118_1$ and $118_2$ and/or have credentials for utilizing the access networks $118_1$ and $118_2$). In some embodiments, the user equipment 108 can connect to the access network $118_1$ and $118_2$ (1) concurrently such that the user equipment 108 maintains connections with the access networks $118_1$ and $118_2$ simultaneously or (2) sequentially such that the user equipment 108 can connect to either of the access networks $118_1$ and $118_2$ but is only connected to one of the access networks $118_1$ and $118_2$ at any single point in time. In one embodiment, the ANDSF server 116 provides the user equipment 108 with rules/policies governing the connection to access networks $118_1$ and $118_2$. For example, in one embodiment, the central data center 102 may include an Edge Cloud Exposure Interface (ECEI) 114. The ECEI 114 may expose application orchestration information from the data store 112 to various other components of the cloud environment 100, including the ANDSF server 116, such that the ANDSF server 116 can generate/update access network selection policies that assist the user equipment 108 to (1) select an access network 118 to connect (e.g., select between the access networks $118_1$ and $118_2$ to connect with) and/or (2) select which access network 118 to route particular data flows (e.g., select between access network $118_1$ and $118_2$ to transfer a particular data flow).

For example, the ECEI 114 can (1) receive requests from the ANDSF server 116 and/or other components a network system, (2) retrieve application orchestration information from the data store 112 in response to the received request, and (3) transmit the application orchestration information to the requesting ANDSF server 116 or other function. In one embodiment, the ECEI 114 can support two types of modes: (1) a request-response mode and (2) a subscribe-notify mode.

In the request-response mode, the ECEI 114 receives a request for application orchestration information from the ANDSF server 116, which identifies the application for which the ANDSF server 116 would like information (e.g., an identifier or domain of the application). In response to the request, the ECEI 114 queries the data store 112 with the identifying information to retrieve corresponding/matching application orchestration information. The ECEI 114 may format the matching application orchestration information for delivery to the requesting ANDSF server 116. In one embodiment, the matching application orchestration information may include an identifier of an application along with identifiers for a set of locations/data centers where an instance of the application is currently running/operating. For example, in response to a request for the application App X from the ANDSF server 116, the ECEI 114 may return the identifier for the application App X (i.e., "App X") along with identifiers for the central data center 102, the edge data center $104_1$, and the edge data center $104_N$ (e.g., CD1, EDC1, and EDCN, respectively). In the request-response mode, a single response message is passed to the requesting ANDSF server 116 (i.e., the request-response mode is a one-time interaction between the ECEI 114 and the ANDSF server 116). Accordingly, the ANDSF server 116 will need to poll the ECEI 114 at some interval or otherwise at the discretion of the ANDSF server 116 to determine updates to the application orchestration information.

In the subscribe-notify mode, the ECEI 114 receives a subscription request for application orchestration information from the ANDSF server 116, which identifies the application for which the ANDSF server 116 would like information (e.g., an identifier or domain of the application). Similar to the request-response mode, in response to the subscription request, the ECEI 114 queries the data store 112 with the identifying information to retrieve matching application orchestration information. The ECEI 114 may format the application orchestration information results for delivery to the requesting ANDSF server 116. Again, the application orchestration information results may include an identifier of the application along with identifiers for a set of locations/data centers where an instance of the application is currently running/operating. In contrast to the request-response mode, in the subscribe-notify mode, the ECEI 114 monitors application orchestration information in the data store 112 to determine any updates for the identified application. For example, in response to the instantiation App X.1 being removed from the edge data center $104_1$, the local orchestrator $110_1$ reports this change to the global orchestrator 106 and the global orchestrator 106 updates the application orchestration information in the data store 112. The ECEI 114, which is monitoring the data store 112, detects this change and transmits application orchestration information to the ANDSF server 116 to reflect the change. In particular, the ECEI 114 may return the identifier for the application App X (i.e., "App X") along with identifiers for the central data center 102 and the edge data center $104_N$ (e.g., CD1 and EDCN) where instances of the application App X are still operating/running. Accordingly, in the subscribe-notify mode, upon the ANDSF server 116 requesting subscription to a particular application, the ECEI 114 will continue to deliver application orchestration information updates for this application to the ANDSF server 116 until an unsubscribe request is received by the ECEI 114 from the ANDSF server 116 in relation to the application. In either mode, the ECEI 114 may require authentication and authorization operations to be performed with the ANDSF server 116 before querying of the data store 112 can be performed by the ECEI 114 on behalf of the ANDSF server 116.

In response to receipt of application orchestration information from the ECEI 114, the ANDSF server 116 may generate or update one or more access network policies for assisting the user equipment 108 to intelligently (1) select an access network 118 for connection and/or (2) select a particular access network 118 for routing a particular set of data based on application orchestration information. For example, FIG. 2 shows an example set of access network policies $202_1$ and $202_2$, which may be generated/updated by the ANDSF server 116 in response to application orchestration information from the ECEI 114. The access network policies 202 used by the edge cloud system 100 may include one or more of inter-system mobility policies (ISMPs), which are used by user equipment that only permit a single connection to an access network 118 at a time (i.e., simultaneous connections to access networks 118 are not possible/permitted), and inter-system routing policies (ISRPs), which are used by user equipment that permit multiple connections to separate access networks 118 simultaneously. As shown in FIG. 2, the access network policies 202 include (1) an access network policy identifier 204, (2) a description/condition 206, which outlines conditions for corresponding rules of the access network policy 202 to be applied, (3) a rule priority 208, which indicates a priority when multiple access network policies 202 could be applied, (4) routing criteria 210, which indicates routing conditions for applying routing rules, and (5) routing rule 212, which indicates rules for connecting to access networks 118 and routing data via these corresponding access networks 118. For example, the access network policy $202_1$, corresponding to the access network policy identifier 204 with the value "1", includes the description/condition 206 indicating that the access network policy $202_1$ applies to data/communication of the application App X (i.e., the application with the identifier "AppX"), associated with the domain "AppX.com", and associated with the starting source IP address "A.B.C.D". When the description/condition 206 for the access network policy $202_1$ is met, the routing rules 212 for the access network policy $202_1$ are performed (i.e., the user equipment 108 will prioritize (1) connecting to access network $118_1$, which is a 5G network, and/or (2) routing associated data/communications through access network $118_1$ instead of the access network $118_2$, which is a IEEE 802.11 network with access identifier "WIFI EDC1") according to the routing criteria 210 of the access network policy $202_1$ (i.e., during peak hours) and the rule priority 208 of the access network policy $202_1$ (i.e., a priority of "2"). For the access network policy $202_2$, corresponding to the access network policy identifier 204 with the value "2", this access network policy $202_2$ includes the description/condition 206 indicating that the access network policy $202_2$ applies to data/communication of the application App Y (i.e., the application with the identifier "AppY"), and associated with the starting source IP address "U.V.W.X". When the description/condition 206 for the access network policy $202_2$ is met, the routing rules 212 for the access network policy $202_2$ are performed (i.e., the user equipment 108 will prioritize (1) connecting to access network $118_1$, which is a IEEE 802.11 network with access identifier "WIFI EDC1", and/or (2) routing associated data/communications through access network $118_1$ instead of the access network $118_2$, which is a LTE network) according to the routing criteria 210 of the access network policy $202_2$ (i.e., validityarea="3GPPLOCATION") and the rule priority 208 of the access network policy $202_2$ (i.e., a priority of "1").

Following generation or update, the ANDSF server 116 may store and/or update access network policies 202 in the ANDSF repository 120. The ANDSF repository 120 stores generated/updated access network policies 202 for subsequent transfer/transmission to the user equipment 108. For example, upon the user equipment 108 connecting to one of the access networks $118_1$ and $118_2$, the ANDSF server 116 may transmit/deliver one or more access network policies 202 to the user equipment 108. Accordingly, the user equipment 108 and the ANDSF server 116 maintain an interface for communicating (1) requests for access network policies 202 and/or (2) access network policies 202, which may be delivered to the user equipment 108 in response to requests. The interface between the user equipment 108 and the ANDSF server 116 could be based on the S14 interface defined in 3GPP, which is compatible with the Open Mobile Alliance (OMA) Device Management (DM) protocol. If a network function other than the ANDSF server 116 is used by the edge cloud system 100 to assist the user equipment 108 to perform network selection and discovery, the corresponding interface between the user equipment 108 and that network function can be used.

Based on the access network policies 202 received from the ANDSF server 116, the user equipment 108 can select (1) select an access network 118 to connect (e.g., select between the access networks $118_1$ and $118_2$ to connect with) and/or (2) select which access network 118 to route particular data flows (e.g., select between access network $118_1$ and $118_2$ to transfer a particular data flow). For example, when the access network policy $202_1$ is transmitted/provided to the user equipment 108, the user equipment 108 may determine that for data/communications relating to application App X (i.e., the application with the identifier "AppX"), associated with the domain "AppX.com", and associated with the starting source IP address "A.B.C.D", the user equipment 108 will prioritize (1) connecting to access network $118_1$ and/or (2) routing associated data/communications through access network $118_1$ during peak hours. Accordingly, the application orchestration information that was used to generate/update the access network policies 202 are used to assist the user equipment 108 in determining/managing access network 118 connections. In this way, the application orchestration information is used to intelligently control access network 118 selection by user equipment 108 to improve network quality and efficiency.

Figure 3A:
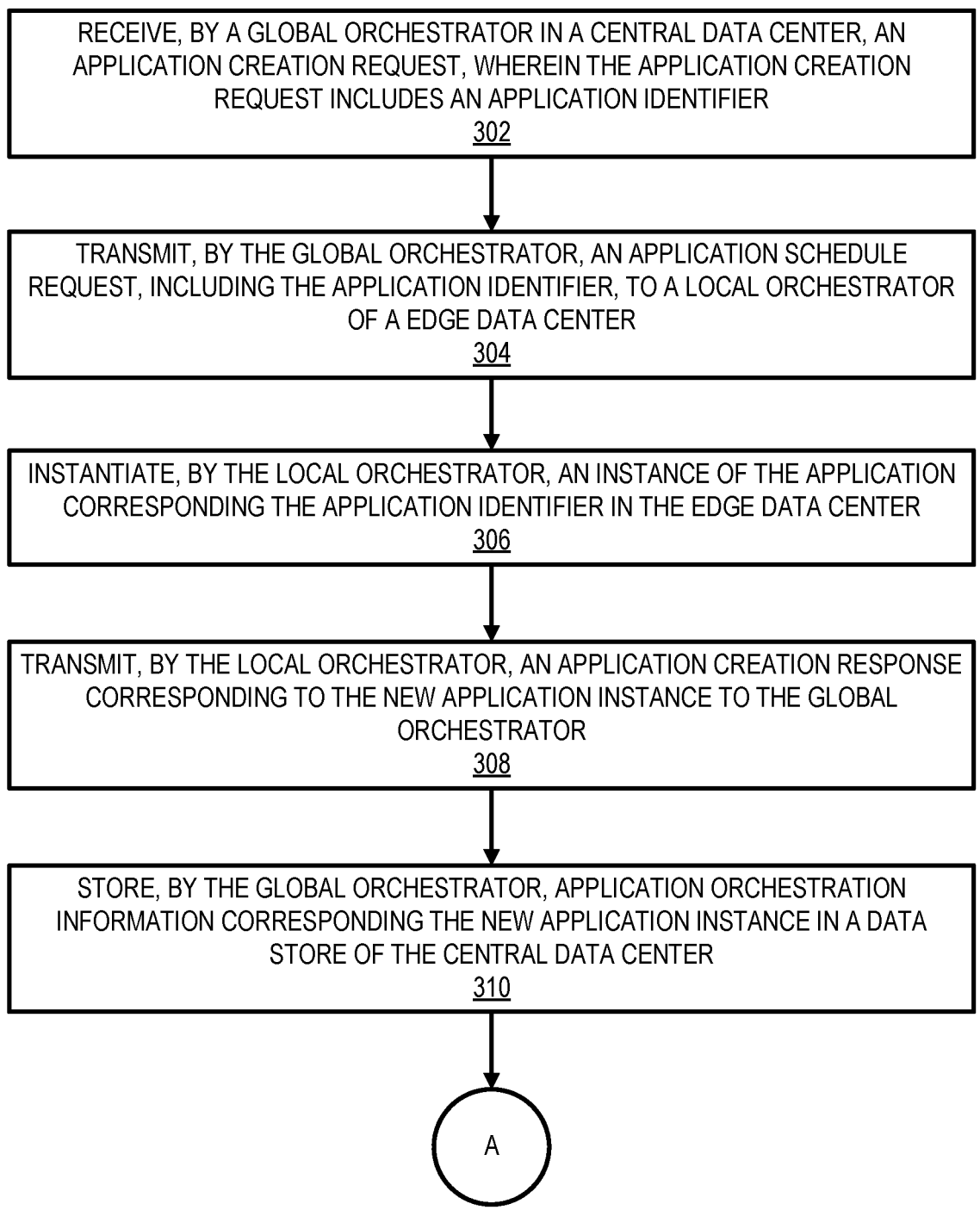
FIGS. 3A-3C illustrate a method for dynamic access network selection by user equipment based on application orchestration information in an edge cloud system, according to one example embodiment.
Figure 3B:
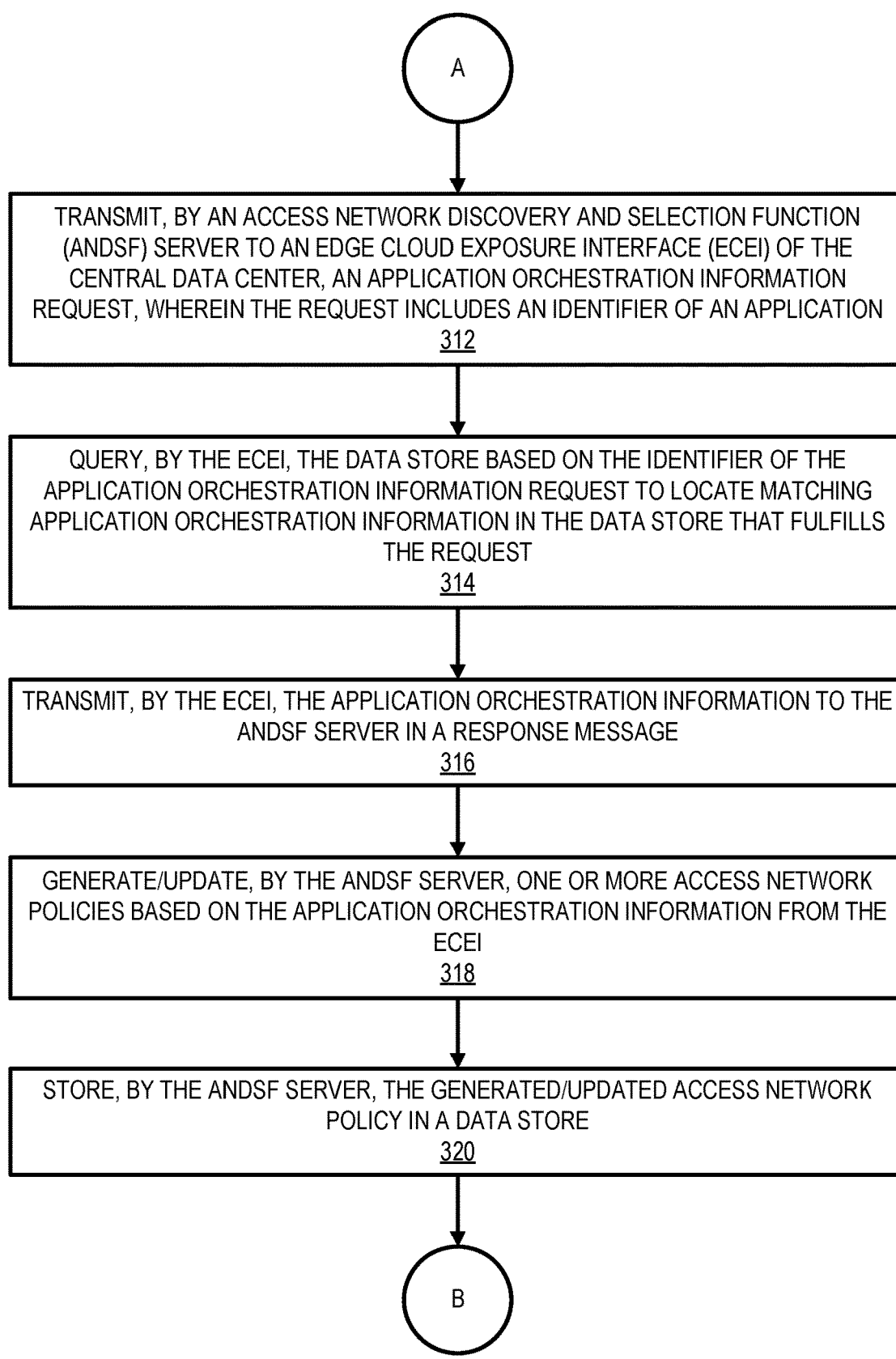
Figure 3C:
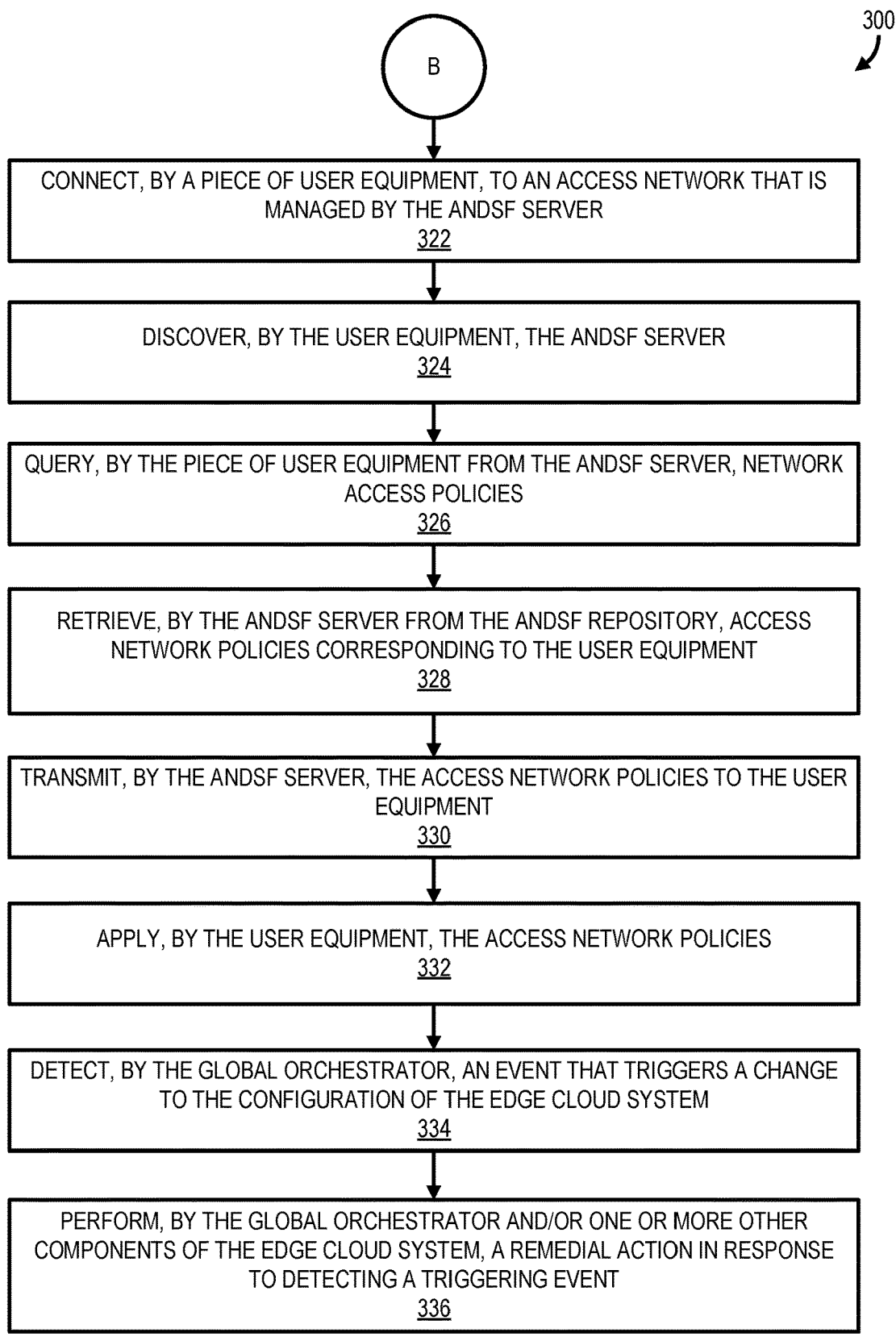

Turning now to FIGS. 3A-3C, a method 300 will be described for dynamic access network 118 selection by user equipment 108 based on application orchestration information in an edge cloud system 100, according to one example embodiment. The operations in the flow diagrams will be described with reference to the exemplary embodiments of the other figures. For example, the method 300 will be described in relation to the sequence diagrams 400A-400E shown in FIGS. 4A-4E, respectively. However, it should be understood that the operations of the flow diagrams can be performed by embodiments of the invention other than those discussed with reference to the other figures, and the embodiments of the invention discussed with reference to these other figures can perform operations different than those discussed with reference to the flow diagrams.

Figure 4A:
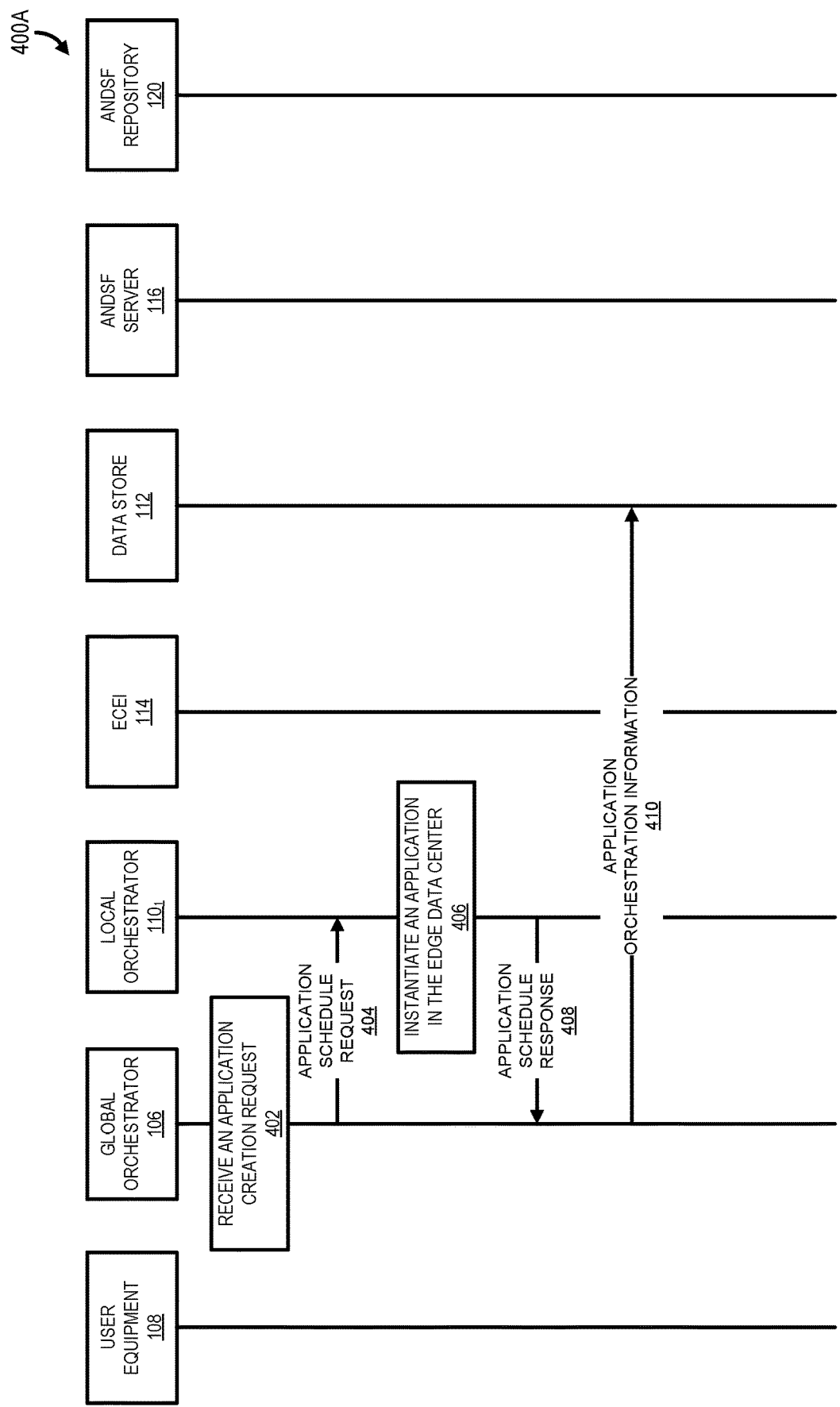
Figure 4C:
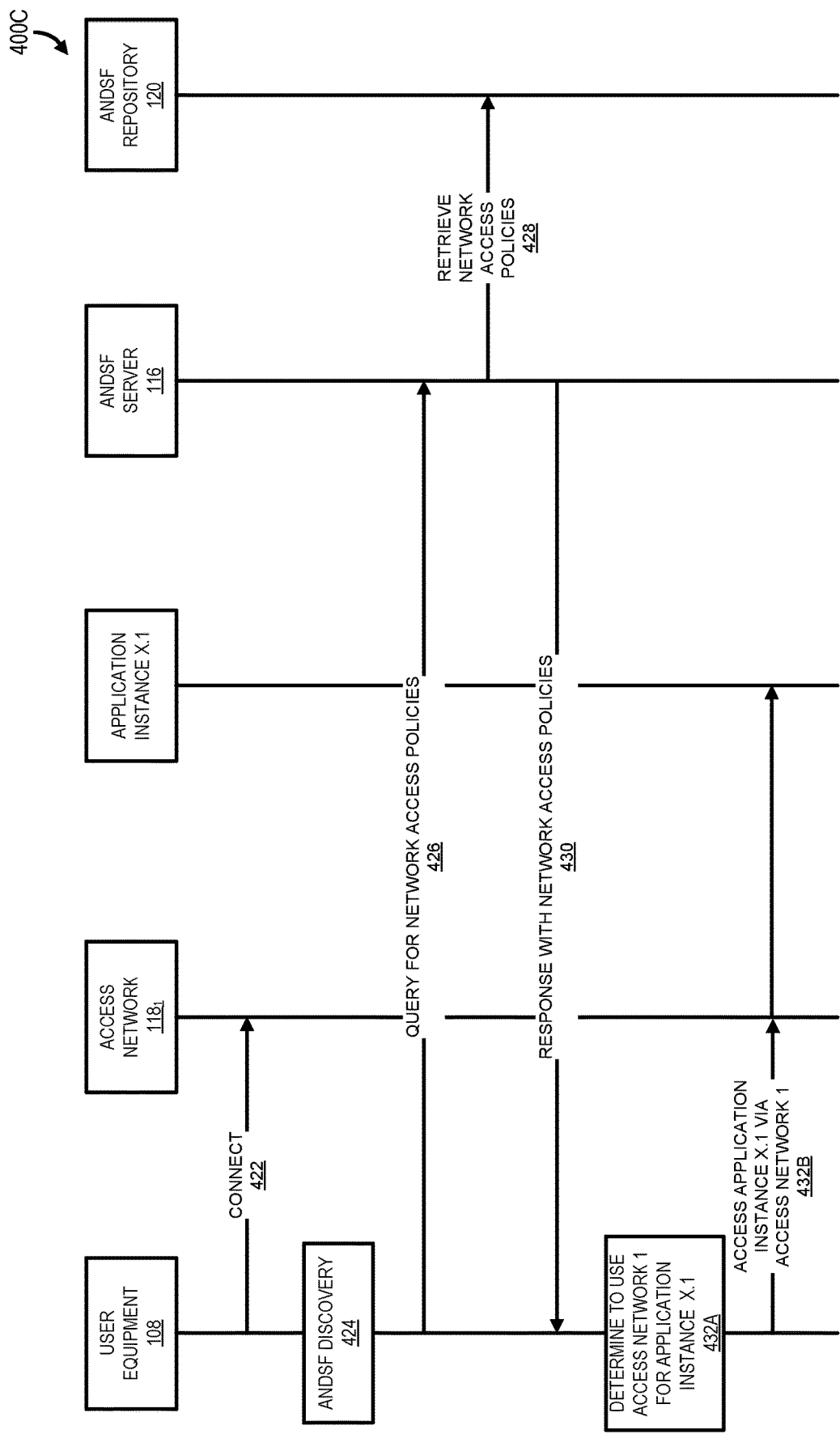
Figure 4D:
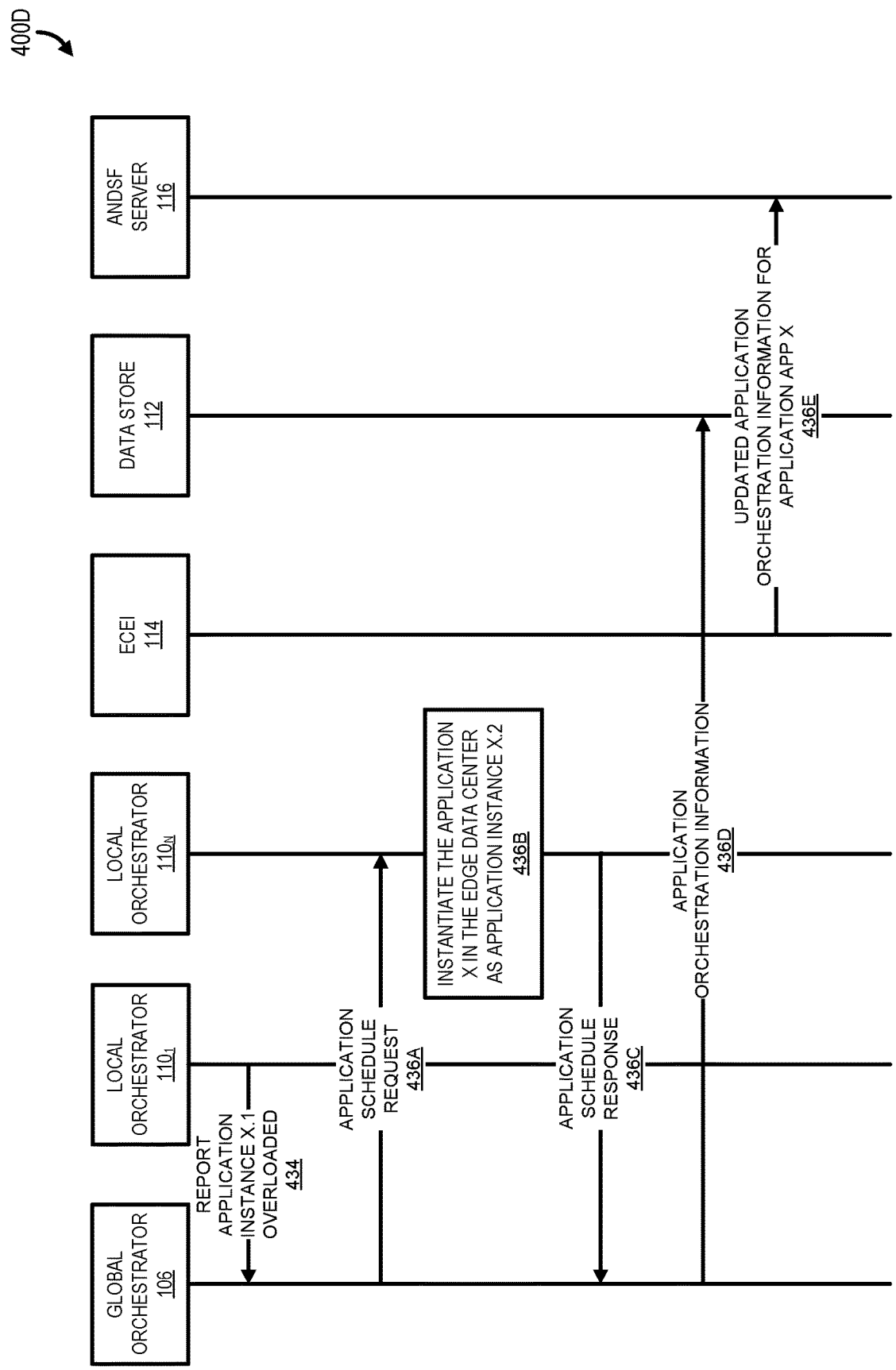
Figure 4E:
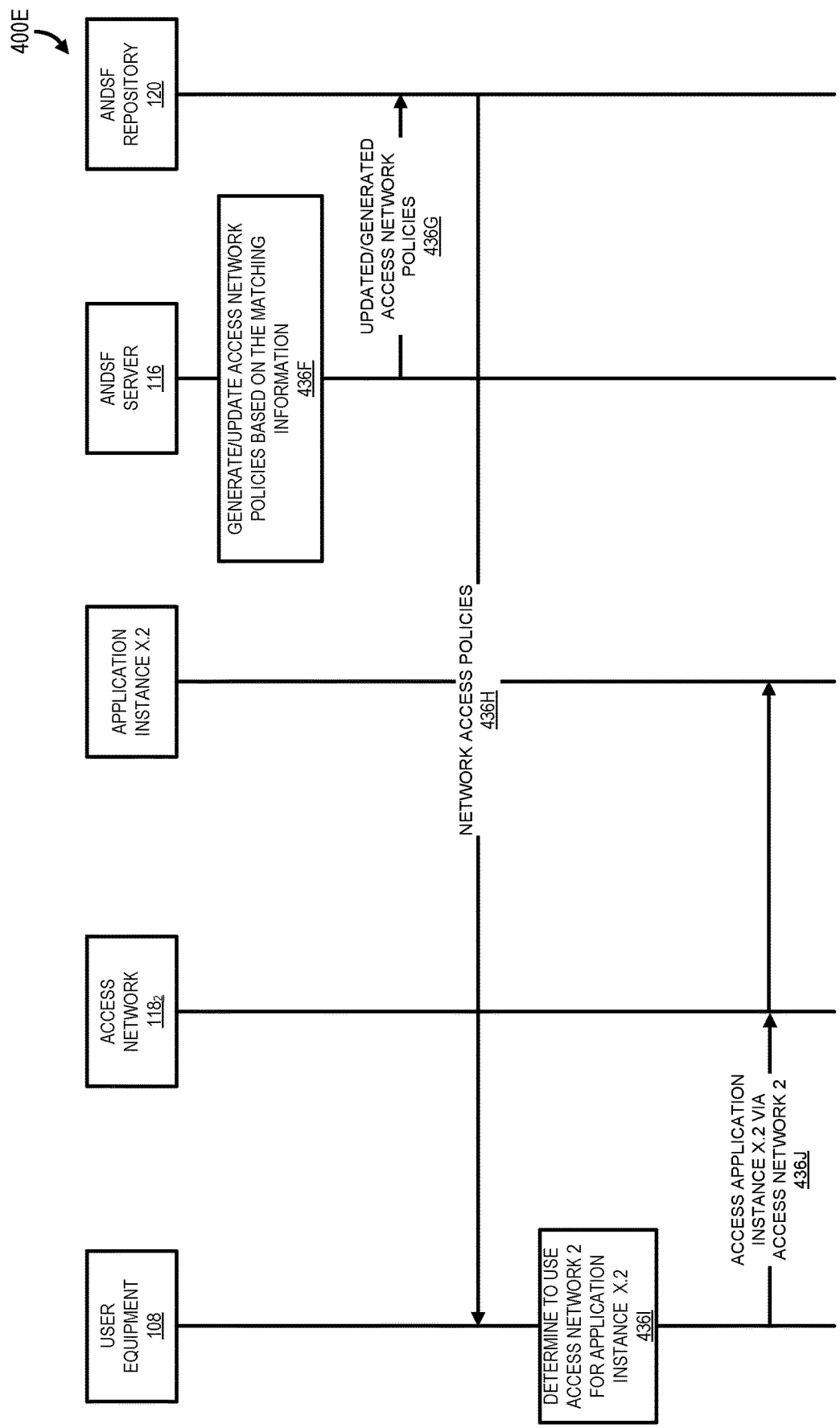

As shown in FIG. 3A, the method 300 may commence at operation 302 with the global orchestrator 106 in the central data center 102 receiving an application creation request as shown at item 402 in the sequence diagram 400A of FIG. 4A. The application creation request, which includes an application identifier, is a request to instantiate an application corresponding to the application identifier in the edge cloud system 100. The application creation request may be received from an administrator of the edge cloud system 100, a network operator, or a user of the user equipment 108.

At operation 304, the global orchestrator 106 transmits/forwards an application schedule request to a local orchestrator 110 of an edge data center 104 based on the application creation request. In particular, the application schedule request may include the application identifier of the application creation request. In one embodiment, the global orchestrator 106 may monitor each edge data center $104_1$-$104_N$ in the edge cloud system 100, including capabilities and current load of the edge data centers $104_1$-$104_N$, and may determine an edge data center 104 to transmit the application schedule request based on the capabilities and/or load of the edge data centers $104_1$-$104_N$ and the requirements of the application to be instantiated. For example, as shown at item 404 in the sequence diagram 400A, the local orchestrator $110_1$ may receive the application schedule request from the global orchestrator 106.

At operation 306, the local orchestrator 110 that received the application schedule request may instantiate the application corresponding to the application identifier in the edge data center 104. For example, the application schedule request may include an application identifier corresponding to the application App X (e.g., the application identifier is "AppX") and the local orchestrator $110_1$ may receive the application schedule request as shown at item 404 in the sequence diagram 400A. In this example, the local orchestrator $110_1$ may create the application instance App X.1 in the edge data center $104_1$ as shown at item 406 in the sequence diagram 400A. For purposes of illustration, this example scenario will be used to further explain the method 300.

At operation 308, the local orchestrator $110_1$ of the edge data center $104_1$ may transmit an application creation response to the global orchestrator 106 confirming that the application instance App X.1 was created in the edge data center $104_1$, as shown at item 408 in the sequence diagram 400A. The application creation response may include an identifier of the application instance App X.1 (e.g., the identifier of the application instance App X.1 is "X.1") and any other information describing the application instance App X.1 in the edge data center $104_1$.

At operation 310, the global orchestrator 106 stores application orchestration information in the data store 112 corresponding to the new application instance App X.1 created in the edge data center $104_1$ at operation 306. For example, as shown at item 410 in the sequence diagram 400A, the global orchestrator 106 transmits application orchestration information to the data store 112 for storage. The application orchestration information may include one or more of an identifier of the application App X (e.g., "X"), an identifier of the application instance App X.1 (e.g., "X.1"), a domain of the application App X, and an identifier of the edge data center $104_1$ where the application instance App X.1 was created (e.g., "EDC1").

At operation 312, the ANDSF server 116 transmits an application orchestration information request to the ECEI 114 as shown at item 412 in the sequence diagram 400B in FIG. 4B. The application orchestration information request may include an identifier of an application for which the ANDSF server 116 would like information. For example, when the ANDSF server 116 would like information regarding the application App X, the application orchestration information request may include the identifier "AppX". For purposes of explanation of the method 300, the application orchestration information request will be assumed to include the identifier "AppX". The application orchestration information request may either be (1) a request-response request, which results in a single response from the ECEI 114 regarding the identified application App X, or (2) a subscribe-notify request, which results in potentially multiple responses form the ECEI 114 regarding the identified application App X.

At operation 314, the ECEI 114 queries the data store 112 based on the identifier of the application App X (e.g., "AppX") in the application orchestration information request to locate application orchestration information in the data store 112 that satisfies the application orchestration information request. For example, when the identifier in the application orchestration information request corresponds to the application App X (e.g., the identifier in the application orchestration information request is "AppX"), the located application orchestration information includes (1) the identifier of the application (i.e., "AppX") and (2) identifiers of each edge data center 104 (and/or the central data center 102) that includes an instance of the application App X. For instance, when the edge data center $104_1$ and the edge data center $104_N$ include the instances App X.1 and App X.2, respectively, the located/matching application orchestration information includes "AppX: EDC1, EDC2". As shown at items 414A and 414B of the sequence diagram 400B, the ECEI 114 queries the data store 112 and retrieves matching application orchestration information corresponding to the application orchestration information request.

At operation 316, the ECEI 114 transmits the located/matching application orchestration information from operation 314 to the ANDSF server 116 in a response message as shown at item 416 of the sequence diagram 400B. Using the example described above in relation to application App X, the application orchestration information transmitted by the ECEI 114 to the ANDSF server 116 includes "AppX: EDC1, EDC2".

At operation 318, the ANDSF server 116 generates or updates one or more access network policies 202 based on the located application orchestration information received from the ECEI 114 as shown at item 418 of the sequence diagram 400B. For example, when the matching application orchestration information corresponds to a preexisting access network policy 202, which is stored in the ANDSF repository 120 (e.g., a preexisting access network policy 202 in the ANDSF repository 120 is related to the application App X), the ANDSF server 116 can update the access network policy 202 as needed per the matching application orchestration information. Alternatively or additionally, the ANDSF server 116 can generate an entirely new access network policy 202 based on the matching application orchestration information received from the ECEI 114.

At operation 320, the ANDSF server 116 stores the generated/updated access network policies 202 in the ANDSF repository 120 as shown at item 420 of the sequence diagram 400B. Accordingly, the ANDSF repository 120 stores all current access network policies 202 that can be utilized by the user equipment 108 for selecting one or more access networks 118.

At operation 322, the user equipment 108 connects to an access network 118. In particular, as noted above, the user equipment 108 may be capable of connecting to both of the access networks $118_1$ and $118_2$ (e.g., the user equipment 108 is within range of radios of the access networks $118_1$ and $118_2$ and/or have credentials for utilizing the access networks $118_1$ and $118_2$). At operation 322, the user equipment connects to at least one of these access networks 118 that is managed by the ANDSF server 116. For example, as shown at item 422 of the sequence diagram 400C of FIG. 4C, the user equipment 108 connects to the access network $118_1$.

At operation 324, the user equipment 108 discovers the ANDSF server 116. In particular, the ANDSF server 116 manages or is otherwise associated with the access network 118 that the user equipment 108 connected to at operation 322, and the user equipment 108 can discover the ANDSF server 116. For example, as shown at item 424 of the sequence diagram 400C, the user equipment 108 discovers the ANDSF server 116 after connecting to the access network $118_1$.

At operation 326, the user equipment 108 queries the ANDSF server 116 for access network policies 202 associated with or applicable to the user equipment 108 as shown at item 426 of the sequence diagram 400C. As will be described below, these access network policies 202 may assist the user equipment 108 in determining which access network 118 to connect to and/or which access network 118 to use with particular data flows.

At operation 328, the ANDSF server 116 retrieves from the ANDSF repository 120 access network policies 202 corresponding to the user equipment 108 as shown at item 428 of the sequence diagram 400C. In one embodiment, a network operator indicates which access network policies 202 are associated with or applicable to the user equipment 108 such that these access network policies 202 are retrieved from the ANDSF repository 120. In another embodiment, access network policies 202 are associated with the user equipment 108 based on which access network 118 the user equipment 108 can connect (e.g., access network policies 202 that relate to access networks 118 that the user equipment 108 can connect (e.g., the user equipment 108 is in range and has appropriate credentials) are associated with the user equipment 108) such that these access network policies 202 are retrieved from the ANDSF repository 120.

At operation 330, the ANDSF server 116 transmits the access network policies 202 retrieved from the ANDSF repository 120 to the user equipment 108. For example, as shown at item 430 of the sequence diagram 400C, the ANDSF server 116 transmits the access network policies 202 retrieved from the ANDSF repository 120 to the user equipment 108 in a response message.

At operation 332, the user equipment 108 evaluates/applies the access network policies 202 received from the ANDSF server 116. In particular, the user equipment 108 can (1) select an access network 118 to connect (e.g., select between the access networks $118_1$ and $118_2$ to connect with) and/or (2) select which access network 118 to route particular data flows (e.g., select between access network $118_1$ and $118_2$ to transfer a particular data flow). For example, when the access network policy $202_1$ is transmitted/provided to the user equipment 108, the user equipment 108 may determine that for data/communications relating to application App X (i.e., the application with the identifier "AppX"), associated with the domain "AppX.com", and associated with the starting source IP address "A.B.C.D", the user equipment 108 will prioritize (1) connecting to access network $118_1$ and/or (2) routing associated data/communications through access network $118_1$ during peak hours. As shown at items 432A and 432B of the sequence diagram 400C, the user equipment 108 determines to use access network $118_1$ for data/communications associated with application instance X.1. Accordingly, as described above, the application orchestration information that was used to generate/update the access network policies 202 are used to assist the user equipment 108 determine/manage access network 118 connections. In this way, the application orchestration information is used to intelligently control access network 118 selection by user equipment 108 to improve network quality and efficiency.

At operation 334, the global orchestrator 106 in conjunction with one or more local orchestrators 110, may detect an event that triggers a change to the configuration of the edge cloud system 100, including operation of one or more applications instances. This change results in a consequent change to the application orchestration information and possibly changes to the access network policies 202. For example, as shown at item 434 of the sequence diagram 400D in FIG. 4D, the local orchestrator $110_1$, detects and reports that application instance X.1 is overloaded.

At operation 336, the global orchestrator 106 in conjunction with one or more other components of the edge cloud system 100, takes a remedial action in response to the detected event. For example, as shown at items 436A-436I of the sequence diagrams 400D and 400E in FIGS. 4D and 4E, global orchestrator 106 in conjunction with several other components of the edge cloud system 100 can take remedial action in response to detecting an overload event at item 434 in relation to the application instance X.1. In particular, in response to a report at item 434 from the local orchestrator $110_1$ that the application instance X.1 is overloaded, the global orchestrator 106 may transmit an application schedule request to the local orchestrator $110_N$ at item 436A with an identifier of the application X (e.g., the identifier "AppX"), which causes the local orchestrator $110_N$ to create/place an instance of the application X (i.e., the application instance X.2) in the edge data center $104_N$ at item 436B. Thereafter, the local orchestrator $110_N$ can transmit a completion response to the global orchestrator 106 confirming successful completion of the instantiation of the application App X at item 436C. Upon receipt of the completion response from the local orchestrator $110_N$, the global orchestrator 106 can store information in the data store 112 at item 436D, which indicates that an instance of the application App X is currently running/operating in the edge data center $104_N$. Based on this update to the application orchestration information for the application App X, to which the ANDSF server 116 is subscribed, the ECEI 114 may transmit the updated application orchestration information for the application App X to the ANDSF server 116 at item 436E. In response, the updated application orchestration information for the application App X, the ANDSF server 116 may generate/update access network policies 202 at item 436F and stores these updated/generated access network policies 202 in the ANDSF repository 120 at item 436G such that the updated/generated access network policies 202 can be delivered to the user equipment 108 at item 436H. The user equipment 108 may thereafter use the updated/generated access network policies 202 to modify access network 118 selection/configuration. For example, since the application instance X.1 is determined to be overloaded, the updated/generated access network policies 202 may indicate a priority for access network $118_2$ for the application App X (i.e., use of application instance X.2 in edge data center $104_N$ via access network $118_2$. In this example, the user equipment 108 may determine at items 436I and 436J of the sequence diagram 400E to use access network $118_2$ for data/communications associated with application App X. Accordingly, as described above, the application orchestration information that was used to generate/update the access network policies 202 are used to assist the user equipment 108 determine/manage access network 118 connections.

Figure 5A:
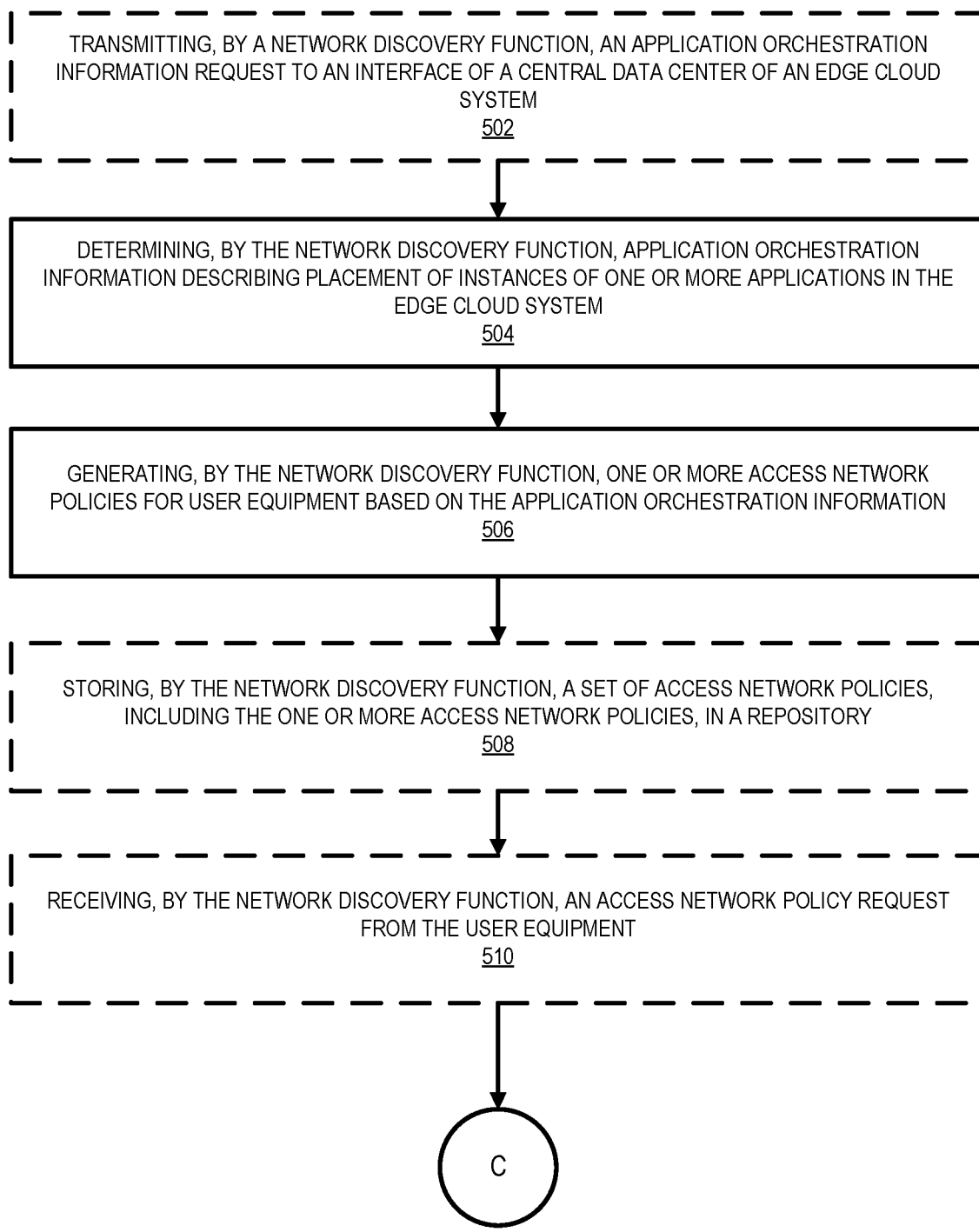
FIGS. 5A-5B illustrate a method for dynamic access network selection by user equipment based on application orchestration information in an edge cloud system, according to one example embodiment.
Figure 5B:
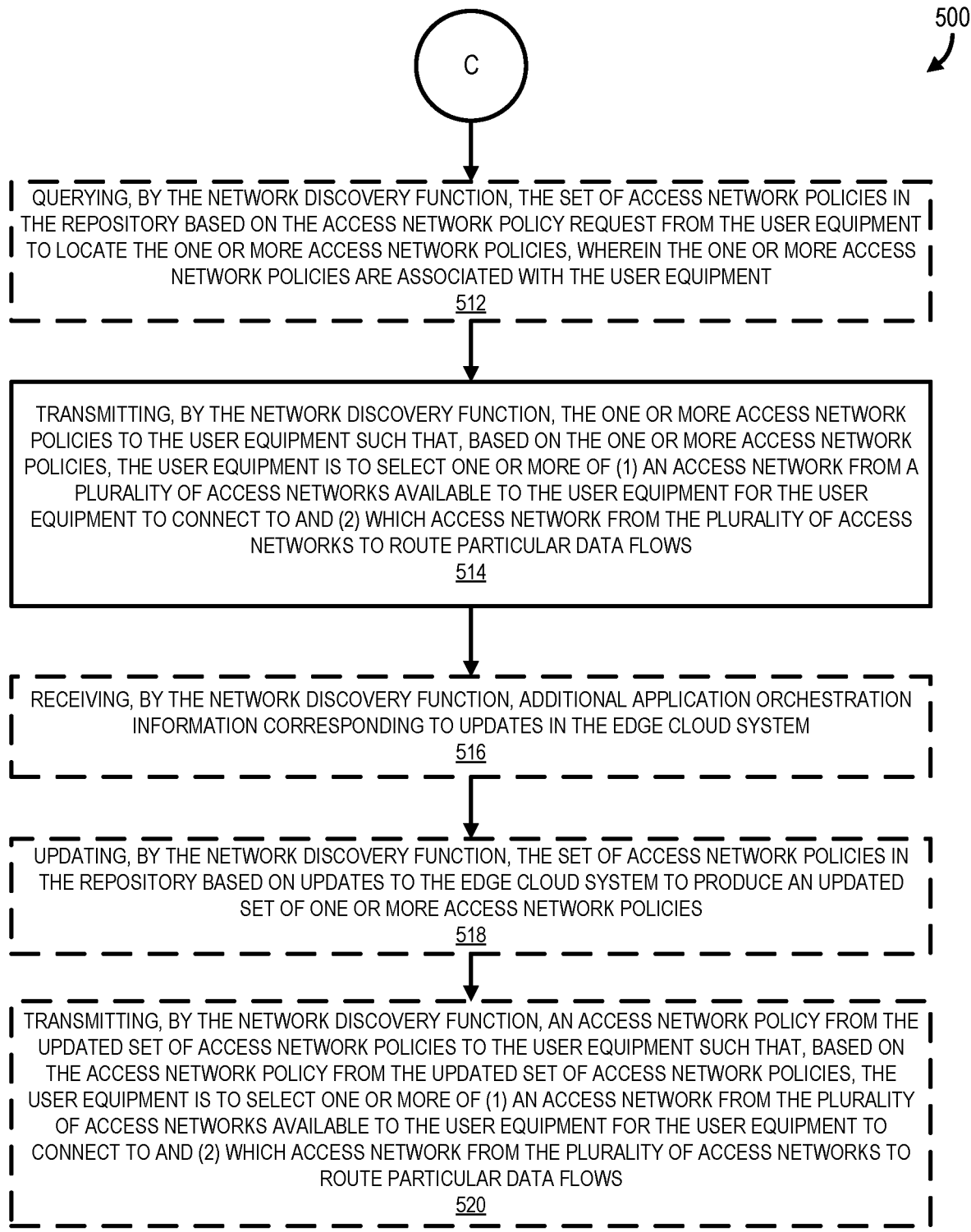

Turning now to FIGS. 5A and 5B, a method 500 will be described for dynamic access network 118 selection by user equipment 108 based on application orchestration information in an edge cloud system 100, according to one example embodiment. The operations in the flow diagrams will be described with reference to the exemplary embodiments of the other figures. However, it should be understood that the operations of the flow diagrams can be performed by embodiments of the invention other than those discussed with reference to the other figures, and the embodiments of the invention discussed with reference to these other figures can perform operations different than those discussed with reference to the flow diagrams.

As shown in FIG. 5A, the method 500 may commence at 502 with a network discovery function (e.g., the ANDSF server 116) transmitting an application orchestration information request to an interface (e.g., the ECEI 114) of the central data center 102 of an edge cloud system 100. In one embodiment, the application orchestration information request includes an identifier of an application such that the application orchestration information includes identifiers of each data center 102 and/or 104 in the edge cloud system 100 in which an instance of the application is placed. In some embodiments, the application orchestration information request is a subscription request such that the interface of the central data center 102 is to provide additional application orchestration information after updates to the application orchestration information for the application are detected.

At operation 504, the network discovery function determines application orchestration information describing placement of instances of one or more applications in the edge cloud system 100. For example, the interface may transmit application orchestration information that matches the request from operation 502 to the network discovery function in a response message such that the network discovery function determines/receives application orchestration information describing placement of instances of one or more applications at operation 504.

At operation 506, the network discovery function generates/updates one or more access network policies 202 for user equipment 108 based on the application orchestration information. For example, when the determines application orchestration information corresponds to a preexisting access network policy 202, the network discovery function can update the access network policy 202 as needed per the determined application orchestration information. Alternatively or additionally, the network discovery function can generate an entirely new access network policy 202 based on the determined application orchestration information.

At operation 508, the network discovery function stores a set of access network policies 202, including the one or more access network policies 202 from operation 506, in a repository (e.g., the ANDSF repository 120).

At operation 510, the network discovery function receives an access network policy request from the user equipment 108. For example, the user equipment 108 may connect to an access network 118 and discover the network discovery function. Based on this discovery, the user equipment 108 queries the network discovery function for access network policies 202 associated with or applicable to the user equipment 108 (i.e., the user equipment 108 transmits an access network policy request to the network discovery function).

At operation 512, the network discovery function queries the set of access network policies 202 in the repository based on the access network policy request from the user equipment 108 to locate the one or more access network policies 202, wherein the one or more access network policies 202 are associated with the user equipment 108. In one embodiment, a network operator indicates which access network policies 202 are associated with or applicable to the user equipment 108 such that these access network policies 202 are retrieved from the network discovery function. In another embodiment, access network policies 202 are associated with the user equipment 108 based on which access network 118 the user equipment 108 can connect (e.g., access network policies 202 that relate to access networks 118 that the user equipment 108 can connect (e.g., the user equipment 108 is in range and has appropriate credentials) are associated with the user equipment 108) such that these access network policies 202 are retrieved from the network discovery function based on a query at operation 512. In some embodiments, the set of access network policies 202 include one or more of an inter-system mobility policy and an inter-system routing policy.

At operation 514, the network discovery function transmits the one or more access network policies 202 to the user equipment 108 such that, based on the one or more access network policies 202, the user equipment 108 is to select one or more of (1) an access network 118 from a plurality of access networks 118 available to the user equipment 108 for the user equipment 108 to connect to and (2) which access network 118 from the plurality of access networks 118 to route particular data flows. In one embodiment, the network discovery function transmits the one or more access network policies 202 to the user equipment 108 in response to querying the repository.

At operation 516, the network discovery function receives additional application orchestration information corresponding to updates in the edge cloud system 100. For example, the network discovery function may receive additional application orchestration information from the interface of the central data center 102 corresponding to the movement or new instantiation of an application in the edge cloud system 100.

At operation 518, the network discovery function updates the set of access network policies 202 in the repository based on updates to the edge cloud system 100 to produce an updated set of one or more access network policies 202.

At operation 520, the network discovery function transmits an access network policy 202 from the updated set of access network policies 202 to the user equipment 108 such that, based on the access network policy 202 from the updated set of access network policies 202, the user equipment 108 is to select one or more of (1) an access network 118 from the plurality of access networks 118 available to the user equipment 108 for the user equipment 108 to connect to and (2) which access network 118 from the plurality of access networks 118 to route particular data flows.

Turning now to FIG. 6, a method 600 will be described for dynamic access network 118 selection by user equipment 108 based on application orchestration information in an edge cloud system 100, according to one example embodiment. The operations in the flow diagrams will be described with reference to the exemplary embodiments of the other figures. However, it should be understood that the operations of the flow diagrams can be performed by embodiments of the invention other than those discussed with reference to the other figures, and the embodiments of the invention discussed with reference to these other figures can perform operations different than those discussed with reference to the flow diagrams.

As shown in FIG. 6, the method 600 may commence at 602 the user equipment 108 determining a first set of one or more access network policies 202 which were generated/updated based on application orchestration information describing placement of instances of one or more applications in the edge cloud system 100. In one embodiment, the user equipment 108 receives the first set of one or more access network policies 202 from a network discovery function (e.g., the ANDSF server 116) of the edge cloud system 100.

At operation 604, the user equipment 108 applies the first set of one or more access network policies 202 such that the user equipment 108 is to select (1) an access network 118 from a plurality of access networks 118 available to the user equipment 108 for the user equipment 108 to connect to and (2) which access network 118 from the plurality of access networks 118 to route particular data flows based on the first set of one or more access network policies 202.

At operation 606, the user equipment 108 determines a second set of one or more access network policies 202 in response to a change to the edge cloud system 100. In some embodiments, the second set of one or more access network policies 202 were generated/updated based on updated application orchestration information describing placement of instances of the one or more applications in the edge cloud system 100 following detection of the change to the edge cloud system 100.

At operation 608, the user equipment 108 applies the second set of one or more access network policies 202 such that one or more of the data flows is routed to another access network 118 in the plurality of access networks 118. In some embodiments, the first set of access network policies 202 and the second set of access network policies 202 each includes one or more of an inter-system mobility policy and an inter-system routing policy.

An electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, solid state drives, read only memory (ROM), flash memory devices, phase change memory) and machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors (e.g., wherein a processor is a microprocessor, controller, microcontroller, central processing unit, digital signal processor, application specific integrated circuit, field programmable gate array, other electronic circuitry, a combination of one or more of the preceding) coupled to one or more machine-readable storage media to store code for execution on the set of processors and/or to store data. For instance, an electronic device may include non-volatile memory containing the code since the non-volatile memory can persist code/data even when the electronic device is turned off (when power is removed), and while the electronic device is turned on that part of the code that is to be executed by the processor(s) of that electronic device is typically copied from the slower non-volatile memory into volatile memory (e.g., dynamic random access memory (DRAM), static random access memory (SRAM)) of that electronic device. Typical electronic devices also include a set or one or more physical network interface(s) (NI(s)) to establish network connections (to transmit and/or receive code and/or data using propagating signals) with other electronic devices. For example, the set of physical NIs (or the set of physical NI(s) in combination with the set of processors executing code) may perform any formatting, coding, or translating to allow the electronic device to send and receive data whether over a wired and/or a wireless connection. In some embodiments, a physical NI may comprise radio circuitry capable of receiving data from other electronic devices over a wireless connection and/or sending data out to other devices via a wireless connection. This radio circuitry may include transmitter(s), receiver(s), and/or transceiver(s) suitable for radiofrequency communication. The radio circuitry may convert digital data into a radio signal having the appropriate parameters (e.g., frequency, timing, channel, bandwidth, etc.). The radio signal may then be transmitted via antennas to the appropriate recipient(s). In some embodiments, the set of physical NI(s) may comprise network interface controller(s) (NICs), also known as a network interface card, network adapter, or local area network (LAN) adapter. The NIC(s) may facilitate in connecting the electronic device to other electronic devices allowing them to communicate via wire through plugging in a cable to a physical port connected to a NIC. One or more parts of an embodiment of the invention may be implemented using different combinations of software, firmware, and/or hardware.

A network device (ND) is an electronic device that communicatively interconnects other electronic devices on the network (e.g., other network devices, end-user devices). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video).

Figure 7A:
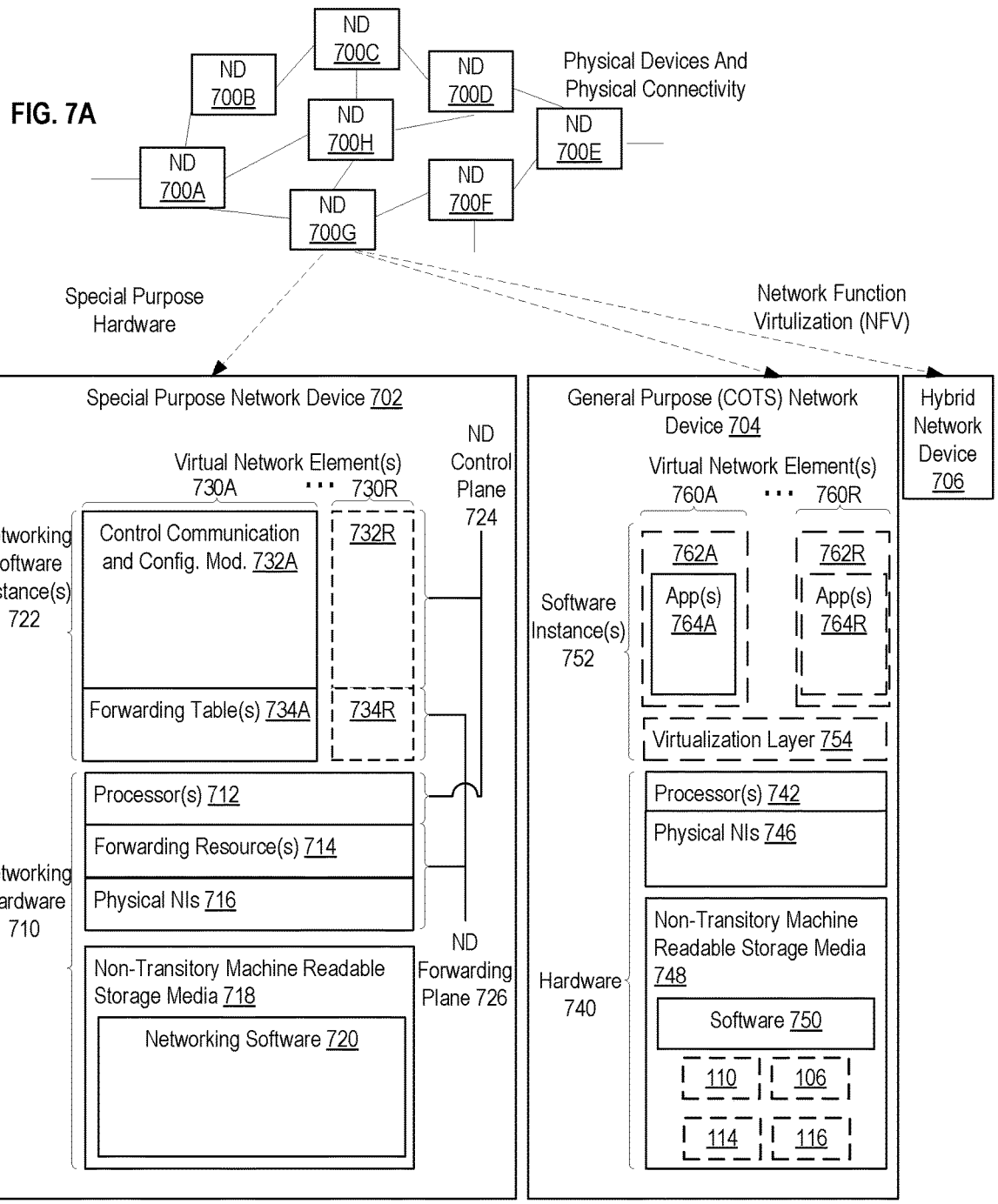
FIG. 7A illustrates connectivity between network devices (NDs) within an exemplary network, as well as three exemplary implementations of the NDs, according to some embodiments.

FIG. 7A illustrates connectivity between network devices (NDs) within an exemplary network, as well as three exemplary implementations of the NDs, according to some embodiments of the invention. FIG. 7A shows NDs 700A-H, and their connectivity by way of lines between 700A-700B, 700B-700C, 700C-700D, 700D-700E, 700E-700F, 700F-700G, and 700A-700G, as well as between 700H and each of 700A, 700C, 700D, and 700G. These NDs are physical devices, and the connectivity between these NDs can be wireless or wired (often referred to as a link). An additional line extending from NDs 700A, 700E, and 700F illustrates that these NDs act as ingress and egress points for the network (and thus, these NDs are sometimes referred to as edge NDs; while the other NDs may be called core NDs).

Two of the exemplary ND implementations in FIG. 7A are: 1) a special-purpose network device 702 that uses custom application-specific integrated-circuits (ASICs) and a special-purpose operating system (OS); and 2) a general purpose network device 704 that uses common off-the-shelf (COTS) processors and a standard OS.

The special-purpose network device 702 includes networking hardware 710 comprising a set of one or more processor(s) 712, forwarding resource(s) 714 (which typically include one or more ASICs and/or network processors), and physical network interfaces (NIs) 716 (through which network connections are made, such as those shown by the connectivity between NDs 700A-H), as well as non-transitory machine readable storage media 718 having stored therein networking software 720. During operation, the networking software 720 may be executed by the networking hardware 710 to instantiate a set of one or more networking software instance(s) 722. Each of the networking software instance(s) 722, and that part of the networking hardware 710 that executes that network software instance (be it hardware dedicated to that networking software instance and/or time slices of hardware temporally shared by that networking software instance with others of the networking software instance(s) 722), form a separate virtual network element 730A-R. Each of the virtual network element(s) (VNEs) 730A-R includes a control communication and configuration module 732A-R (sometimes referred to as a local control module or control communication module) and forwarding table(s) 734A-R, such that a given virtual network element (e.g., 730A) includes the control communication and configuration module (e.g., 732A), a set of one or more forwarding table(s) (e.g., 734A), and that portion of the networking hardware 710 that executes the virtual network element (e.g., 730A).

The special-purpose network device 702 is often physically and/or logically considered to include: 1) a ND control plane 724 (sometimes referred to as a control plane) comprising the processor(s) 712 that execute the control communication and configuration module(s) 732A-R; and 2) a ND forwarding plane 726 (sometimes referred to as a forwarding plane, a data plane, or a media plane) comprising the forwarding resource(s) 714 that utilize the forwarding table(s) 734A-R and the physical NIs 716. By way of example, where the ND is a router (or is implementing routing functionality), the ND control plane 724 (the processor(s) 712 executing the control communication and configuration module(s) 732A-R) is typically responsible for participating in controlling how data (e.g., packets) is to be routed (e.g., the next hop for the data and the outgoing physical NI for that data) and storing that routing information in the forwarding table(s) 734A-R, and the ND forwarding plane 726 is responsible for receiving that data on the physical NIs 716 and forwarding that data out the appropriate ones of the physical NIs 716 based on the forwarding table(s) 734A-R.

Figure 7B:
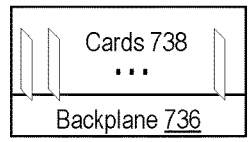
FIG. 7B illustrates an exemplary way to implement a special-purpose network device according to some embodiments.

FIG. 7B illustrates an exemplary way to implement the special-purpose network device 702 according to some embodiments of the invention. FIG. 7B shows a special-purpose network device including cards 738 (typically hot pluggable). While in some embodiments the cards 738 are of two types (one or more that operate as the ND forwarding plane 726 (sometimes called line cards), and one or more that operate to implement the ND control plane 724 (sometimes called control cards)), alternative embodiments may combine functionality onto a single card and/or include additional card types (e.g., one additional type of card is called a service card, resource card, or multi-application card). A service card can provide specialized processing (e.g., Layer 4 to Layer 7 services (e.g., firewall, Internet Protocol Security (IPsec), Secure Sockets Layer (SSL)/ Transport Layer Security (TLS), Intrusion Detection System (IDS), peer-to-peer (P2P), Voice over IP (VoIP) Session Border Controller, Mobile Wireless Gateways (Gateway General Packet Radio Service (GPRS) Support Node (GGSN), Evolved Packet Core (EPC) Gateway)). By way of example, a service card may be used to terminate IPsec tunnels and execute the attendant authentication and encryption algorithms. These cards are coupled together through one or more interconnect mechanisms illustrated as backplane 736 (e.g., a first full mesh coupling the line cards and a second full mesh coupling all of the cards).

Returning to FIG. 7A, the general purpose network device 704 includes hardware 740 comprising a set of one or more processor(s) 742 (which are often COTS processors) and physical NIs 746, as well as non-transitory machine readable storage media 748 having stored therein software 750, a global orchestrator 106, a local orchestrator 110, an ECEI 114, and/or an ANDSF server 116. During operation, the processor(s) 742 execute the software 750, a global orchestrator 106, a local orchestrator 110, an ECEI 114, and/or an ANDSF server 116 to instantiate one or more sets of one or more applications 764A-R. While one embodiment does not implement virtualization, alternative embodiments may use different forms of virtualization. For example, in one such alternative embodiment the virtualization layer 754 represents the kernel of an operating system (or a shim executing on a base operating system) that allows for the creation of multiple instances 762A-R called software containers that may each be used to execute one (or more) of the sets of applications 764A-R; where the multiple software containers (also called virtualization engines, virtual private servers, or jails) are user spaces (typically a virtual memory space) that are separate from each other and separate from the kernel space in which the operating system is run; and where the set of applications running in a given user space, unless explicitly allowed, cannot access the memory of the other processes. In another such alternative embodiment the virtualization layer 754 represents a hypervisor (sometimes referred to as a virtual machine monitor (VMM)) or a hypervisor executing on top of a host operating system, and each of the sets of applications 764A-R is run on top of a guest operating system within an instance 762A-R called a virtual machine (which may in some cases be considered a tightly isolated form of software container) that is run on top of the hypervisor—the guest operating system and application may not know they are running on a virtual machine as opposed to running on a "bare metal" host electronic device, or through para-virtualization the operating system and/or application may be aware of the presence of virtualization for optimization purposes. In yet other alternative embodiments, one, some or all of the applications are implemented as unikernel(s), which can be generated by compiling directly with an application only a limited set of libraries (e.g., from a library operating system (LibOS) including drivers/libraries of OS services) that provide the particular OS services needed by the application. As a unikernel can be implemented to run directly on hardware 740, directly on a hypervisor (in which case the unikernel is sometimes described as running within a LibOS virtual machine), or in a software container, embodiments can be implemented fully with unikernels running directly on a hypervisor represented by virtualization layer 754, unikernels running within software containers represented by instances 762A-R, or as a combination of unikernels and the above-described techniques (e.g., unikernels and virtual machines both run directly on a hypervisor, unikernels and sets of applications that are run in different software containers).

The instantiation of the one or more sets of one or more applications 764A-R, as well as virtualization if implemented, are collectively referred to as software instance(s) 752. Each set of applications 764A-R, corresponding virtualization construct (e.g., instance 762A-R) if implemented, and that part of the hardware 740 that executes them (be it hardware dedicated to that execution and/or time slices of hardware temporally shared), forms a separate virtual network element(s) 760A-R.

The virtual network element(s) 760A-R perform similar functionality to the virtual network element(s) 730A-R—e.g., similar to the control communication and configuration module(s) 732A and forwarding table(s) 734A (this virtualization of the hardware 740 is sometimes referred to as network function virtualization (NFV)). Thus, NFV may be used to consolidate many network equipment types onto industry standard high volume server hardware, physical switches, and physical storage, which could be located in Data centers, NDs, and customer premise equipment (CPE). While embodiments of the invention are illustrated with each instance 762A-R corresponding to one VNE 760A-R, alternative embodiments may implement this correspondence at a finer level granularity (e.g., line card virtual machines virtualize line cards, control card virtual machine virtualize control cards, etc.); it should be understood that the techniques described herein with reference to a correspondence of instances 762A-R to VNEs also apply to embodiments where such a finer level of granularity and/or unikernels are used.

In certain embodiments, the virtualization layer 754 includes a virtual switch that provides similar forwarding services as a physical Ethernet switch. Specifically, this virtual switch forwards traffic between instances 762A-R and the physical NI(s) 746, as well as optionally between the instances 762A-R; in addition, this virtual switch may enforce network isolation between the VNEs 760A-R that by policy are not permitted to communicate with each other (e.g., by honoring virtual local area networks (VLANs)).

The third exemplary ND implementation in FIG. 7A is a hybrid network device 706, which includes both custom ASICs/special-purpose OS and COTS processors/standard OS in a single ND or a single card within an ND. In certain embodiments of such a hybrid network device, a platform VM (i.e., a VM that that implements the functionality of the special-purpose network device 702) could provide for para-virtualization to the networking hardware present in the hybrid network device 706.

Regardless of the above exemplary implementations of an ND, when a single one of multiple VNEs implemented by an ND is being considered (e.g., only one of the VNEs is part of a given virtual network) or where only a single VNE is currently being implemented by an ND, the shortened term network element (NE) is sometimes used to refer to that VNE. Also in all of the above exemplary implementations, each of the VNEs (e.g., VNE(s) 730A-R, VNEs 760A-R, and those in the hybrid network device 706) receives data on the physical NIs (e.g., 716, 746) and forwards that data out the appropriate ones of the physical NIs (e.g., 716, 746). For example, a VNE implementing IP router functionality forwards IP packets on the basis of some of the IP header information in the IP packet; where IP header information includes source IP address, destination IP address, source port, destination port (where "source port" and "destination port" refer herein to protocol ports, as opposed to physical ports of a ND), transport protocol (e.g., user datagram protocol (UDP), Transmission Control Protocol (TCP), and differentiated services code point (DSCP) values.

Figure 7C:
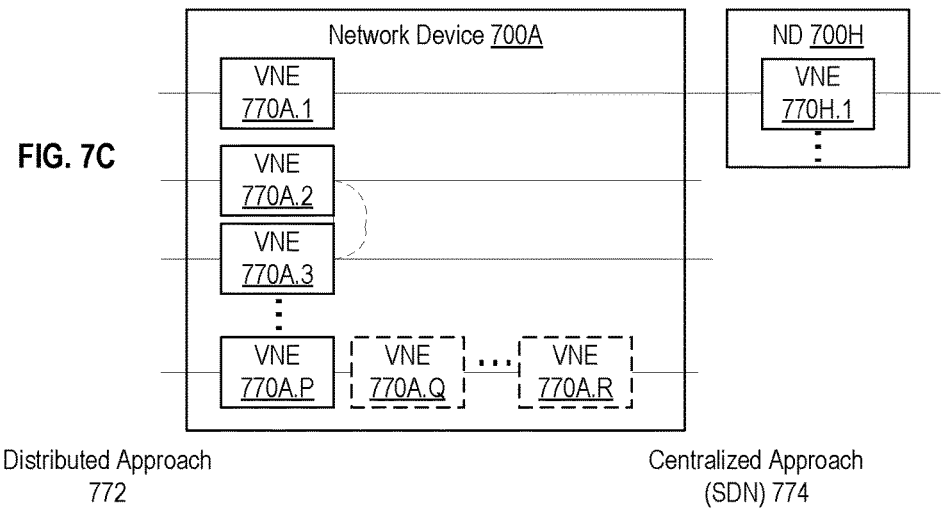
FIG. 7C illustrates various exemplary ways in which virtual network elements (VNEs) may be coupled according to some embodiments.

FIG. 7C illustrates various exemplary ways in which VNEs may be coupled according to some embodiments of the invention. FIG. 7C shows VNEs 770A.1-770A.P (and optionally VNEs 770A.Q-770A.R) implemented in ND 700A and VNE 770H.1 in ND 700H. In FIG. 7C, VNEs 770A.1-P are separate from each other in the sense that they can receive packets from outside ND 700A and forward packets outside of ND 700A; VNE 770A.1 is coupled with VNE 770H.1, and thus they communicate packets between their respective NDs; VNE 770A.2-770A.3 may optionally forward packets between themselves without forwarding them outside of the ND 700A; and VNE 770A.P may optionally be the first in a chain of VNEs that includes VNE 770A.Q followed by VNE 770A.R (this is sometimes referred to as dynamic service chaining, where each of the VNEs in the series of VNEs provides a different service—e.g., one or more layer 4-7 network services). While FIG. 7C illustrates various exemplary relationships between the VNEs, alternative embodiments may support other relationships (e.g., more/fewer VNEs, more/fewer dynamic service chains, multiple different dynamic service chains with some common VNEs and some different VNEs).

The NDs of FIG. 7A, for example, may form part of the Internet or a private network; and other electronic devices (not shown; such as end user devices including workstations, laptops, netbooks, tablets, palm tops, mobile phones, smartphones, phablets, multimedia phones, Voice Over Internet Protocol (VOIP) phones, terminals, portable media players, GPS units, wearable devices, gaming systems, set-top boxes, Internet enabled household appliances) may be coupled to the network (directly or through other networks such as access networks) to communicate over the network (e.g., the Internet or virtual private networks (VPNs) overlaid on (e.g., tunneled through) the Internet) with each other (directly or through servers) and/or access content and/or services. Such content and/or services are typically provided by one or more servers (not shown) belonging to a service/content provider or one or more end user devices (not shown) participating in a peer-to-peer (P2P) service, and may include, for example, public webpages (e.g., free content, store fronts, search services), private webpages (e.g., username/password accessed webpages providing email services), and/or corporate networks over VPNs. For instance, end user devices may be coupled (e.g., through customer premise equipment coupled to an access network (wired or wirelessly)) to edge NDs, which are coupled (e.g., through one or more core NDs) to other edge NDs, which are coupled to electronic devices acting as servers. However, through compute and storage virtualization, one or more of the electronic devices operating as the NDs in FIG. 7A may also host one or more such servers (e.g., in the case of the general purpose network device 704, one or more of the software instances 762A-R may operate as servers; the same would be true for the hybrid network device 706; in the case of the special-purpose network device 702, one or more such servers could also be run on a virtualization layer executed by the processor(s) 712); in which case the servers are said to be co-located with the VNEs of that ND.

A virtual network is a logical abstraction of a physical network (such as that in FIG. 7A) that provides network services (e.g., L2 and/or L3 services). A virtual network can be implemented as an overlay network (sometimes referred to as a network virtualization overlay) that provides network services (e.g., layer 2 (L2, data link layer) and/or layer 3 (L3, network layer) services) over an underlay network (e.g., an L3 network, such as an Internet Protocol (IP) network that uses tunnels (e.g., generic routing encapsulation (GRE), layer 2 tunneling protocol (L2TP), IPSec) to create the overlay network).

A network virtualization edge (NVE) sits at the edge of the underlay network and participates in implementing the network virtualization; the network-facing side of the NVE uses the underlay network to tunnel frames to and from other NVEs; the outward-facing side of the NVE sends and receives data to and from systems outside the network. A virtual network instance (VNI) is a specific instance of a virtual network on a NVE (e.g., a NE/VNE on an ND, a part of a NE/VNE on a ND where that NE/VNE is divided into multiple VNEs through emulation); one or more VNIs can be instantiated on an NVE (e.g., as different VNEs on an ND). A virtual access point (VAP) is a logical connection point on the NVE for connecting external systems to a virtual network; a VAP can be physical or virtual ports identified through logical interface identifiers (e.g., a VLAN ID).

Examples of network services include: 1) an Ethernet LAN emulation service (an Ethernet-based multipoint service similar to an Internet Engineering Task Force (IETF) Multiprotocol Label Switching (MPLS) or Ethernet VPN (EVPN) service) in which external systems are interconnected across the network by a LAN environment over the underlay network (e.g., an NVE provides separate L2 VNIs (virtual switching instances) for different such virtual networks, and L3 (e.g., IP/MPLS) tunneling encapsulation across the underlay network); and 2) a virtualized IP forwarding service (similar to IETF IP VPN (e.g., Border Gateway Protocol (BGP)/MPLS IPVPN) from a service definition perspective) in which external systems are interconnected across the network by an L3 environment over the underlay network (e.g., an NVE provides separate L3 VNIs (forwarding and routing instances) for different such virtual networks, and L3 (e.g., IP/MPLS) tunneling encapsulation across the underlay network)). Network services may also include quality of service capabilities (e.g., traffic classification marking, traffic conditioning and scheduling), security capabilities (e.g., filters to protect customer premises from network—originated attacks, to avoid malformed route announcements), and management capabilities (e.g., full detection and processing).

Figure 7D:
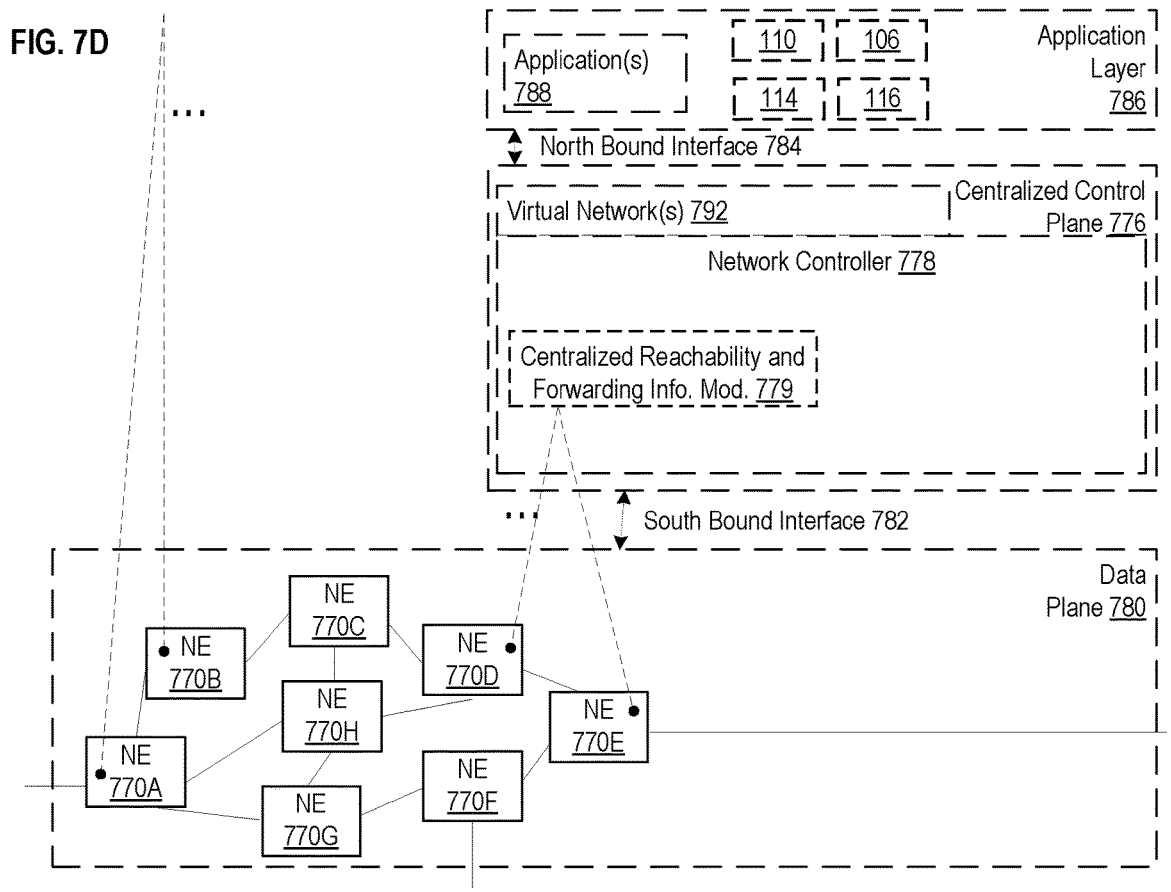
FIG. 7D illustrates a network with a single network element (NE) on each of the NDs, and within this straight forward approach contrasts a traditional distributed approach (commonly used by traditional routers) with a centralized approach for maintaining reachability and forwarding information (also called network control), according to some embodiments of the invention.

FIG. 7D illustrates a network with a single network element on each of the NDs of FIG. 7A, and within this straight forward approach contrasts a traditional distributed approach (commonly used by traditional routers) with a centralized approach for maintaining reachability and forwarding information (also called network control), according to some embodiments of the invention. Specifically, FIG. 7D illustrates network elements (NEs) 770A-H with the same connectivity as the NDs 700A-H of FIG. 7A.

FIG. 7D illustrates that the distributed approach 772 distributes responsibility for generating the reachability and forwarding information across the NEs 770A-H; in other words, the process of neighbor discovery and topology discovery is distributed.

For example, where the special-purpose network device 702 is used, the control communication and configuration module(s) 732A-R of the ND control plane 724 typically include a reachability and forwarding information module to implement one or more routing protocols (e.g., an exterior gateway protocol such as Border Gateway Protocol (BGP), Interior Gateway Protocol(s) (IGP) (e.g., Open Shortest Path First (OSPF), Intermediate System to Intermediate System (IS-IS), Routing Information Protocol (RIP), Label Distribution Protocol (LDP), Resource Reservation Protocol (RSVP) (including RSVP-Traffic Engineering (TE): Extensions to RSVP for LSP Tunnels and Generalized Multi-Protocol Label Switching (GMPLS) Signaling RSVP-TE)) that communicate with other NEs to exchange routes, and then selects those routes based on one or more routing metrics. Thus, the NEs 770A-H (e.g., the processor(s) 712 executing the control communication and configuration module(s) 732A-R) perform their responsibility for participating in controlling how data (e.g., packets) is to be routed (e.g., the next hop for the data and the outgoing physical NI for that data) by distributively determining the reachability within the network and calculating their respective forwarding information. Routes and adjacencies are stored in one or more routing structures (e.g., Routing Information Base (RIB), Label Information Base (LIB), one or more adjacency structures) on the ND control plane 724. The ND control plane 724 programs the ND forwarding plane 726 with information (e.g., adjacency and route information) based on the routing structure(s). For example, the ND control plane 724 programs the adjacency and route information into one or more forwarding table(s) 734A-R (e.g., Forwarding Information Base (FIB), Label Forwarding Information Base (LFIB), and one or more adjacency structures) on the ND forwarding plane 726. For layer 2 forwarding, the ND can store one or more bridging tables that are used to forward data based on the layer 2 information in that data. While the above example uses the special-purpose network device 702, the same distributed approach 772 can be implemented on the general purpose network device 704 and the hybrid network device 706.

FIG. 7D illustrates that a centralized approach 774 (also known as software defined networking (SDN)) that decouples the system that makes decisions about where traffic is sent from the underlying systems that forwards traffic to the selected destination. The illustrated centralized approach 774 has the responsibility for the generation of reachability and forwarding information in a centralized control plane 776 (sometimes referred to as a SDN control module, controller, network controller, OpenFlow controller, SDN controller, control plane node, network virtualization authority, or management control entity), and thus the process of neighbor discovery and topology discovery is centralized. The centralized control plane 776 has a south bound interface 782 with a data plane 780 (sometime referred to the infrastructure layer, network forwarding plane, or forwarding plane (which should not be confused with a ND forwarding plane)) that includes the NEs 770A-H (sometimes referred to as switches, forwarding elements, data plane elements, or nodes). The centralized control plane 776 includes a network controller 778, which includes a centralized reachability and forwarding information module 779 that determines the reachability within the network and distributes the forwarding information to the NEs 770A-H of the data plane 780 over the south bound interface 782 (which may use the OpenFlow protocol). Thus, the network intelligence is centralized in the centralized control plane 776 executing on electronic devices that are typically separate from the NDs.

For example, where the special-purpose network device 702 is used in the data plane 780, each of the control communication and configuration module(s) 732A-R of the ND control plane 724 typically include a control agent that provides the VNE side of the south bound interface 782. In this case, the ND control plane 724 (the processor(s) 712 executing the control communication and configuration module(s) 732A-R) performs its responsibility for participating in controlling how data (e.g., packets) is to be routed (e.g., the next hop for the data and the outgoing physical NI for that data) through the control agent communicating with the centralized control plane 776 to receive the forwarding information (and in some cases, the reachability information) from the centralized reachability and forwarding information module 779 (it should be understood that in some embodiments of the invention, the control communication and configuration module(s) 732A-R, in addition to communicating with the centralized control plane 776, may also play some role in determining reachability and/or calculating forwarding information—albeit less so than in the case of a distributed approach; such embodiments are generally considered to fall under the centralized approach 774, but may also be considered a hybrid approach).

While the above example uses the special-purpose network device 702, the same centralized approach 774 can be implemented with the general purpose network device 704 (e.g., each of the VNE 760A-R performs its responsibility for controlling how data (e.g., packets) is to be routed (e.g., the next hop for the data and the outgoing physical NI for that data) by communicating with the centralized control plane 776 to receive the forwarding information (and in some cases, the reachability information) from the centralized reachability and forwarding information module 779; it should be understood that in some embodiments of the invention, the VNEs 760A-R, in addition to communicating with the centralized control plane 776, may also play some role in determining reachability and/or calculating forwarding information—albeit less so than in the case of a distributed approach) and the hybrid network device 706. In fact, the use of SDN techniques can enhance the NFV techniques typically used in the general purpose network device 704 or hybrid network device 706 implementations as NFV is able to support SDN by providing an infrastructure upon which the SDN software can be run, and NFV and SDN both aim to make use of commodity server hardware and physical switches.

FIG. 7D also shows that the centralized control plane 776 has a north bound interface 784 to an application layer 786, in which resides application(s) 788, a global orchestrator 106, a local orchestrator 110, an ECEI 114, and/or an ANDSF server 116. The centralized control plane 776 has the ability to form virtual networks 792 (sometimes referred to as a logical forwarding plane, network services, or overlay networks (with the NEs 770A-H of the data plane 780 being the underlay network)) for the application(s) 788, a global orchestrator 106, a local orchestrator 110, an ECEI 114, and/or an ANDSF server 116. Thus, the centralized control plane 776 maintains a global view of all NDs and configured NEs/VNEs, and it maps the virtual networks to the underlying NDs efficiently (including maintaining these mappings as the physical network changes either through hardware (ND, link, or ND component) failure, addition, or removal).

While FIG. 7D shows the distributed approach 772 separate from the centralized approach 774, the effort of network control may be distributed differently or the two combined in certain embodiments of the invention. For example: 1) embodiments may generally use the centralized approach (SDN) 774, but have certain functions delegated to the NEs (e.g., the distributed approach may be used to implement one or more of fault monitoring, performance monitoring, protection switching, and primitives for neighbor and/or topology discovery); or 2) embodiments of the invention may perform neighbor discovery and topology discovery via both the centralized control plane and the distributed protocols, and the results compared to raise exceptions where they do not agree. Such embodiments are generally considered to fall under the centralized approach 774, but may also be considered a hybrid approach.

While FIG. 7D illustrates the simple case where each of the NDs 700A-H implements a single NE 770A-H, it should be understood that the network control approaches described with reference to FIG. 7D also work for networks where one or more of the NDs 700A-H implement multiple VNEs (e.g., VNEs 730A-R, VNEs 760A-R, those in the hybrid network device 706). Alternatively or in addition, the network controller 778 may also emulate the implementation of multiple VNEs in a single ND. Specifically, instead of (or in addition to) implementing multiple VNEs in a single ND, the network controller 778 may present the implementation of a VNE/NE in a single ND as multiple VNEs in the virtual networks 792 (all in the same one of the virtual network(s) 792, each in different ones of the virtual network(s) 792, or some combination). For example, the network controller 778 may cause an ND to implement a single VNE (a NE) in the underlay network, and then logically divide up the resources of that NE within the centralized control plane 776 to present different VNEs in the virtual network(s) 792 (where these different VNEs in the overlay networks are sharing the resources of the single VNE/NE implementation on the ND in the underlay network).

Figure 7E:
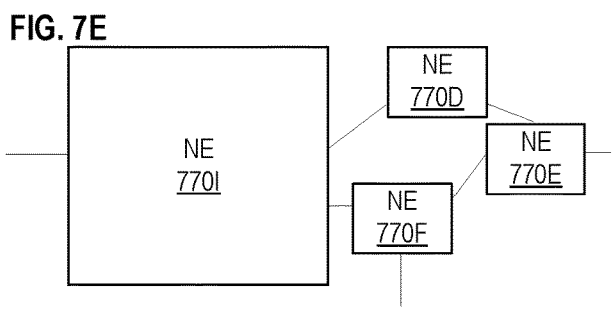
FIG. 7E illustrates the simple case of where each of the NDs implements a single NE, but a centralized control plane has abstracted multiple of the NEs in different NDs into (to represent) a single NE in one of the virtual network(s), according to some embodiments.
Figure 7F:
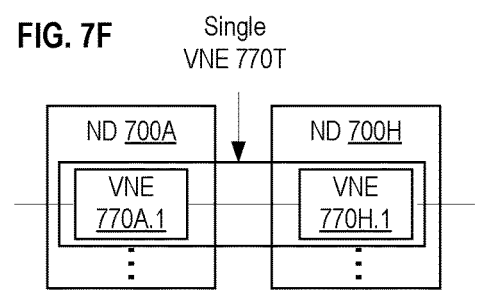
FIG. 7F illustrates a case where multiple VNEs are implemented on different NDs and are coupled to each other, and where a centralized control plane has abstracted these multiple VNEs such that they appear as a single VNE within one of the virtual networks, according to some embodiments.

On the other hand, FIGS. 7E and 7F respectively illustrate exemplary abstractions of NEs and VNEs that the network controller 778 may present as part of different ones of the virtual networks 792. FIG. 7E illustrates the simple case of where each of the NDs 700A-H implements a single NE 770A-H (see FIG. 7D), but the centralized control plane 776 has abstracted multiple of the NEs in different NDs (the NEs 770A-C and G-H) into (to represent) a single NE 7701 in one of the virtual network(s) 792 of FIG. 7D, according to some embodiments of the invention. FIG. 7E shows that in this virtual network, the NE 7701 is coupled to NE 770D and 770F, which are both still coupled to NE 770E.

FIG. 7F illustrates a case where multiple VNEs (VNE 770A.1 and VNE 770H.1) are implemented on different NDs (ND 700A and ND 700H) and are coupled to each other, and where the centralized control plane 776 has abstracted these multiple VNEs such that they appear as a single VNE 770T within one of the virtual networks 792 of FIG. 7D, according to some embodiments of the invention. Thus, the abstraction of a NE or VNE can span multiple NDs.

While some embodiments of the invention implement the centralized control plane 776 as a single entity (e.g., a single instance of software running on a single electronic device), alternative embodiments may spread the functionality across multiple entities for redundancy and/or scalability purposes (e.g., multiple instances of software running on different electronic devices).

Figure 8:
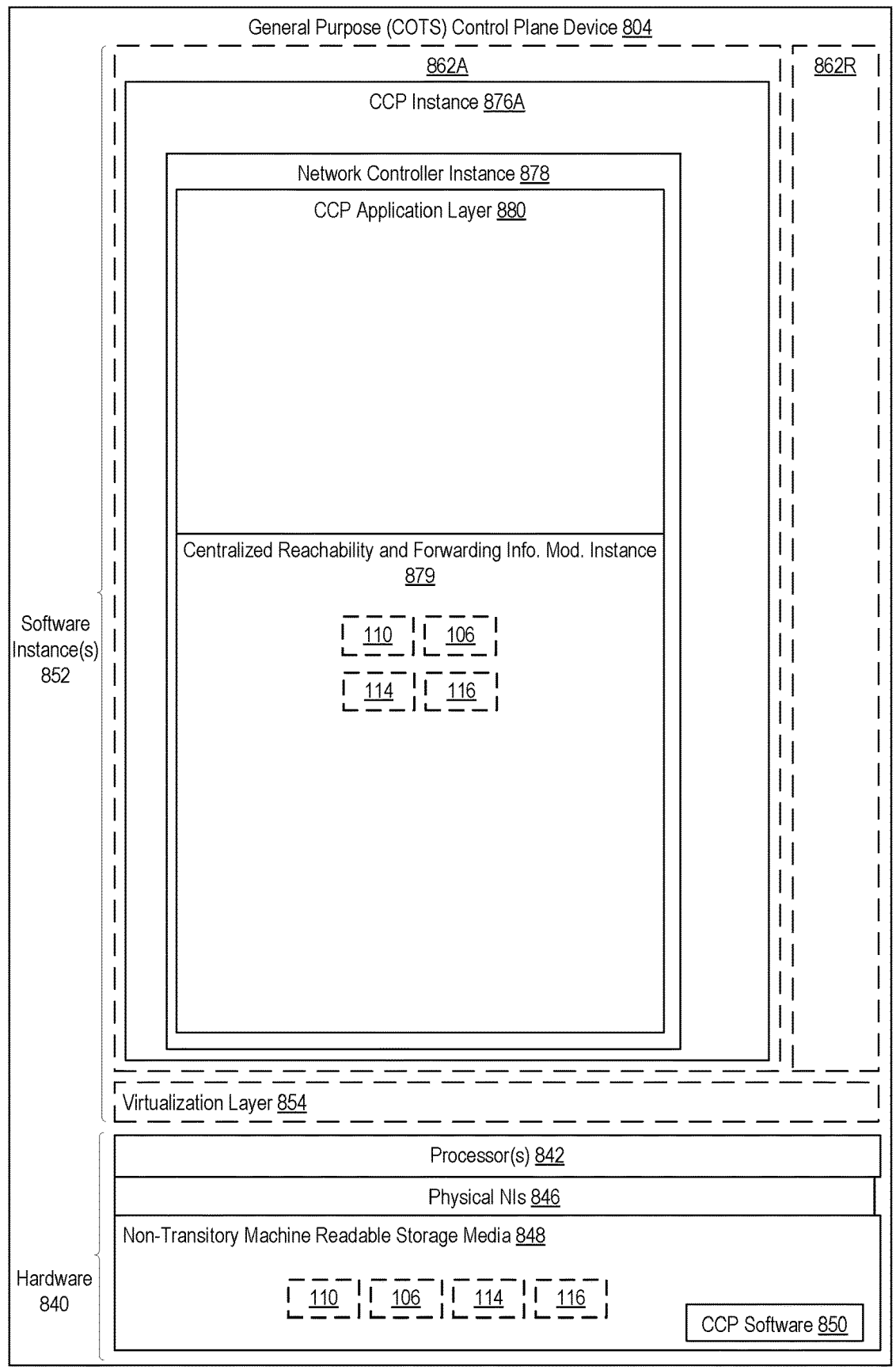
FIG. 8 illustrates a general purpose control plane device with centralized control plane (CCP) software, according to some embodiments.

Similar to the network device implementations, the electronic device(s) running the centralized control plane 776, and thus the network controller 778 including the centralized reachability and forwarding information module 779, may be implemented a variety of ways (e.g., a special purpose device, a general-purpose (e.g., COTS) device, or hybrid device). These electronic device(s) would similarly include processor(s), a set or one or more physical NIs, and a non-transitory machine-readable storage medium having stored thereon the centralized control plane software. For instance, FIG. 8 illustrates a general purpose control plane device 804 including hardware 840 comprising a set of one or more processor(s) 842 (which are often COTS processors) and physical NIs 846, as well as non-transitory machine readable storage media 848 having stored therein centralized control plane (CCP) software 850, a global orchestrator 106, a local orchestrator 110, an ECEI 114, and/or an ANDSF server 116.

In embodiments that use compute virtualization, the processor(s) 842 typically execute software to instantiate a virtualization layer 854 (e.g., in one embodiment the virtualization layer 854 represents the kernel of an operating system (or a shim executing on a base operating system) that allows for the creation of multiple instances 862A-R called software containers (representing separate user spaces and also called virtualization engines, virtual private servers, or jails) that may each be used to execute a set of one or more applications; in another embodiment the virtualization layer 854 represents a hypervisor (sometimes referred to as a virtual machine monitor (VMM)) or a hypervisor executing on top of a host operating system, and an application is run on top of a guest operating system within an instance 862A-R called a virtual machine (which in some cases may be considered a tightly isolated form of software container) that is run by the hypervisor; in another embodiment, an application is implemented as a unikernel, which can be generated by compiling directly with an application only a limited set of libraries (e.g., from a library operating system (LibOS) including drivers/libraries of OS services) that provide the particular OS services needed by the application, and the unikernel can run directly on hardware 840, directly on a hypervisor represented by virtualization layer 854 (in which case the unikernel is sometimes described as running within a LibOS virtual machine), or in a software container represented by one of instances 862A-R). Again, in embodiments where compute virtualization is used, during operation an instance of the CCP software 850 (illustrated as CCP instance 876A) is executed (e.g., within the instance 862A) on the virtualization layer 854. In embodiments where compute virtualization is not used, the CCP instance 876A is executed, as a unikernel or on top of a host operating system, on the "bare metal" general purpose control plane device 804. The instantiation of the CCP instance 876A, as well as the virtualization layer 854 and instances 862A-R if implemented, are collectively referred to as software instance(s) 852.

In some embodiments, the CCP instance 876A includes a network controller instance 878. The network controller instance 878 includes a centralized reachability and forwarding information module instance 879 (which is a middleware layer providing the context of the network controller 778 to the operating system and communicating with the various NEs and for processing a global orchestrator 106, a local orchestrator 110, an ECEI 114, and/or an ANDSF server 116), and an CCP application layer 880 (sometimes referred to as an application layer) over the middleware layer (providing the intelligence required for various network operations such as protocols, network situational awareness, and user—interfaces). At a more abstract level, this CCP application layer 880 within the centralized control plane 776 works with virtual network view(s) (logical view(s) of the network) and the middleware layer provides the conversion from the virtual networks to the physical view.

The centralized control plane 776 transmits relevant messages to the data plane 780 based on CCP application layer 880 calculations and middleware layer mapping for each flow. A flow may be defined as a set of packets whose headers match a given pattern of bits; in this sense, traditional IP forwarding is also flow-based forwarding where the flows are defined by the destination IP address for example; however, in other implementations, the given pattern of bits used for a flow definition may include more fields (e.g., 10 or more) in the packet headers. Different NDs/NEs/VNEs of the data plane 780 may receive different messages, and thus different forwarding information. The data plane 780 processes these messages and programs the appropriate flow information and corresponding actions in the forwarding tables (sometime referred to as flow tables) of the appropriate NE/VNEs, and then the NEs/VNEs map incoming packets to flows represented in the forwarding tables and forward packets based on the matches in the forwarding tables.

Standards such as OpenFlow define the protocols used for the messages, as well as a model for processing the packets. The model for processing packets includes header parsing, packet classification, and making forwarding decisions. Header parsing describes how to interpret a packet based upon a well-known set of protocols. Some protocol fields are used to build a match structure (or key) that will be used in packet classification (e.g., a first key field could be a source media access control (MAC) address, and a second key field could be a destination MAC address).

Packet classification involves executing a lookup in memory to classify the packet by determining which entry (also referred to as a forwarding table entry or flow entry) in the forwarding tables best matches the packet based upon the match structure, or key, of the forwarding table entries. It is possible that many flows represented in the forwarding table entries can correspond/match to a packet; in this case the system is typically configured to determine one forwarding table entry from the many according to a defined scheme (e.g., selecting a first forwarding table entry that is matched). Forwarding table entries include both a specific set of match criteria (a set of values or wildcards, or an indication of what portions of a packet should be compared to a particular value/values/wildcards, as defined by the matching capabilities—for specific fields in the packet header, or for some other packet content), and a set of one or more actions for the data plane to take on receiving a matching packet. For example, an action may be to push a header onto the packet, for the packet using a particular port, flood the packet, or simply drop the packet. Thus, a forwarding table entry for IPv4/IPv6 packets with a particular transmission control protocol (TCP) destination port could contain an action specifying that these packets should be dropped.

Making forwarding decisions and performing actions occurs, based upon the forwarding table entry identified during packet classification, by executing the set of actions identified in the matched forwarding table entry on the packet.

However, when an unknown packet (for example, a "missed packet" or a "match-miss" as used in OpenFlow parlance) arrives at the data plane 780, the packet (or a subset of the packet header and content) is typically forwarded to the centralized control plane 776. The centralized control plane 776 will then program forwarding table entries into the data plane 780 to accommodate packets belonging to the flow of the unknown packet. Once a specific forwarding table entry has been programmed into the data plane 780 by the centralized control plane 776, the next packet with matching credentials will match that forwarding table entry and take the set of actions associated with that matched entry.

A network interface (NI) may be physical or virtual; and in the context of IP, an interface address is an IP address assigned to a NI, be it a physical NI or virtual NI. A virtual NI may be associated with a physical NI, with another virtual interface, or stand on its own (e.g., a loopback interface, a point-to-point protocol interface). A NI (physical or virtual) may be numbered (a NI with an IP address) or unnumbered (a NI without an IP address). A loopback interface (and its loopback address) is a specific type of virtual NI (and IP address) of a NE/VNE (physical or virtual) often used for management purposes; where such an IP address is referred to as the nodal loopback address. The IP address(es) assigned to the NI(s) of a ND are referred to as IP addresses of that ND; at a more granular level, the IP address(es) assigned to NI(s) assigned to a NE/VNE implemented on a ND can be referred to as IP addresses of that NE/VNE.

Next hop selection by the routing system for a given destination may resolve to one path (that is, a routing protocol may generate one next hop on a shortest path); but if the routing system determines there are multiple viable next hops (that is, the routing protocol generated forwarding solution offers more than one next hop on a shortest path—multiple equal cost next hops), some additional criteria is used—for instance, in a connectionless network, Equal Cost Multi Path (ECMP) (also known as Equal Cost Multi Pathing, multipath forwarding and IP multipath) may be used (e.g., typical implementations use as the criteria particular header fields to ensure that the packets of a particular packet flow are always forwarded on the same next hop to preserve packet flow ordering). For purposes of multipath forwarding, a packet flow is defined as a set of packets that share an ordering constraint. As an example, the set of packets in a particular TCP transfer sequence need to arrive in order, else the TCP logic will interpret the out of order delivery as congestion and slow the TCP transfer rate down.

A Layer 3 (L3) Link Aggregation (LAG) link is a link directly connecting two NDs with multiple IP-addressed link paths (each link path is assigned a different IP address), and a load distribution decision across these different link paths is performed at the ND forwarding plane; in which case, a load distribution decision is made between the link paths.

Some NDs include functionality for authentication, authorization, and accounting (AAA) protocols (e.g., RADIUS (Remote Authentication Dial-In User Service), Diameter, and/or TACACS+ (Terminal Access Controller Access Control System Plus). AAA can be provided through a client/server model, where the AAA client is implemented on a ND and the AAA server can be implemented either locally on the ND or on a remote electronic device coupled with the ND. Authentication is the process of identifying and verifying a subscriber. For instance, a subscriber might be identified by a combination of a username and a password or through a unique key. Authorization determines what a subscriber can do after being authenticated, such as gaining access to certain electronic device information resources (e.g., through the use of access control policies). Accounting is recording user activity. By way of a summary example, end user devices may be coupled (e.g., through an access network) through an edge ND (supporting AAA processing) coupled to core NDs coupled to electronic devices implementing servers of service/content providers. AAA processing is performed to identify for a subscriber the subscriber record stored in the AAA server for that subscriber. A subscriber record includes a set of attributes (e.g., subscriber name, password, authentication information, access control information, rate-limiting information, policing information) used during processing of that subscriber's traffic.

Certain NDs (e.g., certain edge NDs) internally represent end user devices (or sometimes customer premise equipment (CPE) such as a residential gateway (e.g., a router, modem)) using subscriber circuits. A subscriber circuit uniquely identifies within the ND a subscriber session and typically exists for the lifetime of the session. Thus, a ND typically allocates a subscriber circuit when the subscriber connects to that ND, and correspondingly de-allocates that subscriber circuit when that subscriber disconnects. Each subscriber session represents a distinguishable flow of packets communicated between the ND and an end user device (or sometimes CPE such as a residential gateway or modem) using a protocol, such as the point-to-point protocol over another protocol (PPPoX) (e.g., where X is Ethernet or Asynchronous Transfer Mode (ATM)), Ethernet, 802.1Q Virtual LAN (VLAN), Internet Protocol, or ATM). A subscriber session can be initiated using a variety of mechanisms (e.g., manual provisioning a dynamic host configuration protocol (DHCP), DHCP/client-less internet protocol service (CLIPS) or Media Access Control (MAC) address tracking). For example, the point-to-point protocol (PPP) is commonly used for digital subscriber line (DSL) services and requires installation of a PPP client that enables the subscriber to enter a username and a password, which in turn may be used to select a subscriber record. When DHCP is used (e.g., for cable modem services), a username typically is not provided; but in such situations other information (e.g., information that includes the MAC address of the hardware in the end user device (or CPE)) is provided. The use of DHCP and CLIPS on the ND captures the MAC addresses and uses these addresses to distinguish subscribers and access their subscriber records.

A virtual circuit (VC), synonymous with virtual connection and virtual channel, is a connection oriented communication service that is delivered by means of packet mode communication. Virtual circuit communication resembles circuit switching, since both are connection oriented, meaning that in both cases data is delivered in correct order, and signaling overhead is required during a connection establishment phase. Virtual circuits may exist at different layers. For example, at layer 4, a connection oriented transport layer datalink protocol such as Transmission Control Protocol (TCP) may rely on a connectionless packet switching network layer protocol such as IP, where different packets may be routed over different paths, and thus be delivered out of order. Where a reliable virtual circuit is established with TCP on top of the underlying unreliable and connectionless IP protocol, the virtual circuit is identified by the source and destination network socket address pair, i.e. the sender and receiver IP address and port number. However, a virtual circuit is possible since TCP includes segment numbering and reordering on the receiver side to prevent out-of-order delivery. Virtual circuits are also possible at Layer 3 (network layer) and Layer 2 (datalink layer); such virtual circuit protocols are based on connection oriented packet switching, meaning that data is always delivered along the same network path, i.e. through the same NEs/VNEs. In such protocols, the packets are not routed individually and complete addressing information is not provided in the header of each data packet; only a small virtual channel identifier (VCI) is required in each packet; and routing information is transferred to the NEs/VNEs during the connection establishment phase; switching only involves looking up the virtual channel identifier in a table rather than analyzing a complete address. Examples of network layer and datalink layer virtual circuit protocols, where data always is delivered over the same path: X.25, where the VC is identified by a virtual channel identifier (VCI); Frame relay, where the VC is identified by a VCI; Asynchronous Transfer Mode (ATM), where the circuit is identified by a virtual path identifier (VPI) and virtual channel identifier (VCI) pair; General Packet Radio Service (GPRS); and Multiprotocol label switching (MPLS), which can be used for IP over virtual circuits (Each circuit is identified by a label).

Certain NDs (e.g., certain edge NDs) use a hierarchy of circuits. The leaf nodes of the hierarchy of circuits are subscriber circuits. The subscriber circuits have parent circuits in the hierarchy that typically represent aggregations of multiple subscriber circuits, and thus the network segments and elements used to provide access network connectivity of those end user devices to the ND. These parent circuits may represent physical or logical aggregations of subscriber circuits (e.g., a virtual local area network (VLAN), a permanent virtual circuit (PVC) (e.g., for Asynchronous Transfer Mode (ATM)), a circuit-group, a channel, a pseudo-wire, a physical NI of the ND, and a link aggregation group). A circuit-group is a virtual construct that allows various sets of circuits to be grouped together for configuration purposes, for example aggregate rate control. A pseudo-wire is an emulation of a layer 2 point-to-point connection-oriented service. A link aggregation group is a virtual construct that merges multiple physical NIs for purposes of bandwidth aggregation and redundancy. Thus, the parent circuits physically or logically encapsulate the subscriber circuits.

Each VNE (e.g., a virtual router, a virtual bridge (which may act as a virtual switch instance in a Virtual Private LAN Service (VPLS) is typically independently administrable. For example, in the case of multiple virtual routers, each of the virtual routers may share system resources but is separate from the other virtual routers regarding its management domain, AAA (authentication, authorization, and accounting) name space, IP address, and routing database(s). Multiple VNEs may be employed in an edge ND to provide direct network access and/or different classes of services for subscribers of service and/or content providers.

Within certain NDs, "interfaces" that are independent of physical NIs may be configured as part of the VNEs to provide higher-layer protocol and service information (e.g., Layer 3 addressing). The subscriber records in the AAA server identify, in addition to the other subscriber configuration requirements, to which context (e.g., which of the VNEs/NEs) the corresponding subscribers should be bound within the ND. As used herein, a binding forms an association between a physical entity (e.g., physical NI, channel) or a logical entity (e.g., circuit such as a subscriber circuit or logical circuit (a set of one or more subscriber circuits)) and a context's interface over which network protocols (e.g., routing protocols, bridging protocols) are configured for that context. Subscriber data flows on the physical entity when some higher-layer protocol interface is configured and associated with that physical entity.

Some NDs provide support for implementing VPNs (Virtual Private Networks) (e.g., Layer 2 VPNs and/or Layer 3 VPNs). For example, the ND where a provider's network and a customer's network are coupled are respectively referred to as PEs (Provider Edge) and CEs (Customer Edge). In a Layer 2 VPN, forwarding typically is performed on the CE(s) on either end of the VPN and traffic is sent across the network (e.g., through one or more PEs coupled by other NDs). Layer 2 circuits are configured between the CEs and PEs (e.g., an Ethernet port, an ATM permanent virtual circuit (PVC), a Frame Relay PVC). In a Layer 3 VPN, routing typically is performed by the PEs. By way of example, an edge ND that supports multiple VNEs may be deployed as a PE; and a VNE may be configured with a VPN protocol, and thus that VNE is referred as a VPN VNE.

Some NDs provide support for VPLS (Virtual Private LAN Service). For example, in a VPLS network, end user devices access content/services provided through the VPLS network by coupling to CEs, which are coupled through PEs coupled by other NDs. VPLS networks can be used for implementing triple play network applications (e.g., data applications (e.g., high-speed Internet access), video applications (e.g., television service such as IPTV (Internet Protocol Television), VoD (Video-on-Demand) service), and voice applications (e.g., VoIP (Voice over Internet Protocol) service)), VPN services, etc. VPLS is a type of layer 2 VPN that can be used for multi-point connectivity. VPLS networks also allow end use devices that are coupled with CEs at separate geographical locations to communicate with each other across a Wide Area Network (WAN) as if they were directly attached to each other in a Local Area Network (LAN) (referred to as an emulated LAN).

In VPLS networks, each CE typically attaches, possibly through an access network (wired and/or wireless), to a bridge module of a PE via an attachment circuit (e.g., a virtual link or connection between the CE and the PE). The bridge module of the PE attaches to an emulated LAN through an emulated LAN interface. Each bridge module acts as a "Virtual Switch Instance" (VSI) by maintaining a forwarding table that maps MAC addresses to pseudowires and attachment circuits. PEs forward frames (received from CEs) to destinations (e.g., other CEs, other PEs) based on the MAC destination address field included in those frames.

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method for dynamic access network selection by a user equipment based on application orchestration information in an edge cloud system, the method comprising:
   transmitting, by a network discovery function server, an application orchestration information request to an Edge Cloud Exposure Interface (ECEI) of a central data center of the edge cloud system, wherein the application orchestration information request includes an identifier of an application such that the application orchestration information includes identifiers of each data center in the edge cloud system in which an instance of the application is placed;
   receiving the application orchestration information transmitted to the network discovery function server in response to the application orchestration information request;
   determining, by a network discovery function, the application orchestration information describing placement of instances of one or more virtualized applications in the edge cloud system, the edge cloud system comprising a plurality of edge data centers, each edge data center supporting respective instances of the one or more virtualized applications, wherein each edge data center includes a local orchestrator, which operates with a global orchestrator associated with a central data center, to instantiate the respective instances of the one or more virtualized applications at that edge data center;
   generating, by the network discovery function, one or more access network policies for the user equipment based on the application orchestration information related to virtualized applications supported at different edge data centers having respective local orchestrators, in which each access network policy of the one or more access network policies includes an access network policy identifier and a condition for corresponding rules of the access network policy, wherein the different edge data centers are associated with different access networks for communicating with the user equipment; and
   transmitting, by the network discovery function, the one or more access network policies to the user equipment such that, based on the one or more access network policies related to the one or more virtualized applications at respective edge data centers, the user equipment determines which one or more access network from a plurality of access networks available to the user equipment to select, for the user equipment to connect to route particular data flows via one or more of the respective edge data centers.

2. The method of claim 1, wherein the application orchestration information request is a subscription request such that the ECEI of the central data center is to provide additional application orchestration information after updates to the application orchestration information for the virtualized applications are detected.

3. The method of claim 2, further comprising:
   storing, by the network discovery function, a set of access network policies, including the one or more access network policies, in a repository;
   receiving, by the network discovery function, an access network policy request from the user equipment; and
   querying, by the network discovery function, the set of access network policies in the repository based on the access network policy request from the user equipment to locate the one or more access network policies, wherein the one or more access network policies are associated with the user equipment, and wherein the network discovery function transmits the one or more access network policies to the user equipment in response to querying the repository.

4. The method of claim 3, wherein the set of access network policies includes one or more of an inter-system mobility policy and an inter-system routing policy.

5. The method of claim 3, further comprising:
   receiving, by the network discovery function, additional application orchestration information corresponding to updates in the edge cloud system;
   updating, by the network discovery function, the set of access network policies in the repository based on updates to the edge cloud system to produce an updated set of access network policies; and
   transmitting, by the network discovery function, an access network policy from the updated set of access network policies to the user equipment such that, based on the access network policy from the updated set of access network policies, the user equipment is to select one or more of an access network from the plurality of access networks available to the user equipment for the user equipment to connect to route particular data flows.

6. The method of claim 5, wherein the network discovery function is an Access Network Discovery and Selection Function (ANDSF) server.

7. A non-transitory machine-readable storage medium that provides instructions that, when executed by a processor of a network discovery function server in an edge cloud system, will cause said processor to perform operations for dynamic access network selection by a user equipment based on application orchestration information comprising:
   transmitting an application orchestration information request to an Edge Cloud Exposure Interface (ECEI) of a central data center of the edge cloud system, wherein the application orchestration information request includes an identifier of an application such that the application orchestration information includes identifiers of each data center in the edge cloud system in which an instance of the application is placed;
   receiving the application orchestration information transmitted to the network discovery function server in response to the application orchestration information request;
   determining the application orchestration information describing placement of instances of one or more virtualized applications in the edge cloud system, the edge cloud system comprising a plurality of edge data centers, each edge data center supporting respective instances of the one or more virtualized applications, wherein each edge data center includes a local orchestrator, which operates with a global orchestrator associated with a central data center, to instantiate the respective instances of the one or more virtualized applications at that edge data center;
   generating one or more access network policies for a user equipment based on the application orchestration information related to virtualized applications supported at different edge data centers having respective local orchestrators, in which each access network policy of the one or more access network policies includes an access network policy identifier and a condition for corresponding rules of the access network policy, wherein the different edge data centers are associated with different access networks for communicating with the user equipment; and transmitting the one or more access network policies to the user equipment such that, based on the one or more access network policies related to the one or more virtualized applications at respective edge data centers, the user equipment determines which one or more access network from a plurality of access networks available to the user equipment to select, for the user equipment to connect to route particular data flows via one or more of the respective edge data centers.

8. The non-transitory machine-readable storage medium of claim 7, wherein the application orchestration information request is a subscription request such that the ECEI of the central data center is to provide additional application orchestration information after updates to the application orchestration information for the virtualized applications are detected.

9. The non-transitory machine-readable storage medium of claim 8, wherein the operations further comprise:
   storing a set of access network policies, including the one or more access network policies, in a repository;
   receiving an access network policy request from the user equipment; and
   querying the set of access network policies in the repository based on the access network policy request from the user equipment to locate the one or more access network policies, wherein the one or more access network policies are associated with the user equipment, and wherein the one or more access network policies are transmitted to the user equipment in response to querying the repository.

10. The non-transitory machine-readable storage medium of claim 9, wherein the set of access network policies includes one or more of an inter-system mobility policy and an inter-system routing policy.

11. The non-transitory machine-readable storage medium of claim 9, wherein the operations further comprise:
   receiving additional application orchestration information corresponding to updates in the edge cloud system;
   updating the set of access network policies in the repository based on updates to the edge cloud system to produce an updated set of access network policies; and
   transmitting an access network policy from the updated set of access network policies to the user equipment such that, based on the access network policy from the updated set of access network policies, the user equipment is to select one or more of an access network from the plurality of access networks available to the user equipment for the user equipment to connect to route particular data flows.

12. The non-transitory machine-readable storage medium of claim 11, wherein the network discovery function server is an Access Network Discovery and Selection Function (ANDSF) server.

13. A method for dynamic access network selection by a user equipment based on application orchestration information in an edge cloud system, the method comprising:
   determining, by the user equipment, a first set of one or more access network policies, which was generated based on the application orchestration information, wherein the application orchestration information is obtained by a network discovery function server transmitting an application orchestration information request to an Edge Cloud Exposure Interface (ECEI) of a central data center of the edge cloud system, wherein the application orchestration information request includes an identifier of an application, such that the application orchestration information includes identifiers of each data center in the edge cloud system in which an instance of the application is placed, and the application orchestration information is received by the network discovery function server in response to the application orchestration information request, and the application orchestration information describing placement of instances of one or more virtualized applications in the edge cloud system, the edge cloud system comprising a plurality of edge data centers, each edge data center supporting respective instances of the one or more virtualized applications, wherein each edge data center includes a local orchestrator, which operates with a global orchestrator associated with a central data center, to instantiate the respective instances of the one or more virtualized applications at that edge data center, in which the application orchestration information is related to virtualized applications supported at different edge data centers having respective local orchestrators, and in which each access network policy of the first set of one or more access network policies includes an access network policy identifier and a condition for corresponding rules of the access network policy, wherein the different edge data centers are associated with different access networks for communicating with the user equipment; and
   applying, by the user equipment, the first set of one or more access network policies related to one or more virtualized applications at respective edge data centers, such that the user equipment determines which one or more access network from a plurality of access networks available to the user equipment to select, for the user equipment to connect to route particular data flows via one or more of the respective edge data centers based on the first set of one or more access network policies.

14. The method of claim 13, further comprising:
   determining, by the user equipment, a second set of one or more access network policies in response to a change to the edge cloud system, wherein the second set of one or more access network policies was generated based on updated application orchestration information describing placement of instances of the one or more virtualized applications in the edge cloud system following detection of the change to the edge cloud system.

15. The method of claim 14, further comprising:
   applying, by the user equipment, the second set of one or more access network policies such that one or more of the particular data flows is routed to another access network in the plurality of access networks.

16. The method of claim 15, wherein the first set of one or more access network policies and the second set of one or more access network policies each includes one or more of an inter-system mobility policy and an inter-system routing policy.

17. The method of claim 13, wherein the network discovery function server is an Access Network Discovery and Selection Function (ANDSF) server.

* * * * *